US012693493B2

(12) United States Patent
Lobachinsky et al.

(10) Patent No.: US 12,693,493 B2
(45) Date of Patent: Jul. 28, 2026

(54) OPTICAL DEVICE ALIGNMENT METHODS

(71) Applicant: Lumus Ltd., Ness Ziona (IL)

(72) Inventors: Lilya Lobachinsky, Tel Aviv (IL);
Naamah Levin, Mevasseret Zion (IL);
Aviv Frommer, Yokneam Moshava (IL)

(73) Assignee: Lumus Ltd., Ness Ziona (IL)

( * ) Notice: Subject to any disclaimer, the term of this
patent is extended or adjusted under 35
U.S.C. 154(b) by 464 days.

(21) Appl. No.: 18/239,784

(22) Filed: Aug. 30, 2023

(65) Prior Publication Data

US 2023/0408791 A1     Dec. 21, 2023

Related U.S. Application Data

(63) Continuation of application No. 16/769,290, filed as
application No. PCT/IB2018/059551 on Dec. 2,
2018, now Pat. No. 11,762,169.

(60) Provisional application No. 62/593,945, filed on Dec.
3, 2017.

(51) Int. Cl.
*G02B 7/18*         (2021.01)
*G02B 7/00*         (2021.01)
*G02B 27/01*        (2006.01)

(52) U.S. Cl.
CPC ........... *G02B 7/1805* (2013.01); *G02B 7/003*
(2013.01); *G02B 27/0172* (2013.01)

(58) Field of Classification Search
CPC .. G02B 7/1805; G02B 7/003; G02B 27/0172;
G02B 7/1822; G02B 27/017
See application file for complete search history.

(56) References Cited

U.S. PATENT DOCUMENTS

| | | |
|---|---|---|
| 5,745,199 A | 4/1998 | Suzuki et al. |
| 8,520,310 B2 | 8/2013 | Shimizu |
| 9,201,242 B2 | 12/2015 | Miyawaki et al. |
| 9,268,107 B2 | 2/2016 | Tan et al. |
| 10,078,377 B2 * | 9/2018 | Balan .................... G06T 19/006 |
| 11,428,926 B2 | 8/2022 | Suzuki et al. |
| 11,630,260 B2 | 4/2023 | Grabarnik et al. |

(Continued)

FOREIGN PATENT DOCUMENTS

| | | |
|---|---|---|
| CN | 101311772 A | 11/2008 |
| CN | 106054392 A | 10/2016 |

(Continued)

*Primary Examiner* — Euncha P Cherry
(74) *Attorney, Agent, or Firm* — Rivka Friedman

(57) ABSTRACT

In one method, a display source aligned with an illumination
prism assembly is displaced along a displacement axis to
adjust the distance between the display source and a colli-
mating prism assembly. The display source, the illumination
prism assembly, and an illumination module are translation-
ally moved in unison in a plane normal to the displacement
axis. In another method, a component of an optical device is
coupled to a mechanical assembly at a known orientation.
The mechanical assembly has a test pattern at a known
orientation. An image sensor is aligned with the test pattern,
and the image sensor captures an image of the test pattern.
The captured image is analyzed to determine an estimated
orientation of the test pattern. An orientation parameter of
the image sensor is adjusted based on a comparison between
the known orientation of the test pattern and the estimated
orientation of the test pattern.

13 Claims, 11 Drawing Sheets

(56)                    References Cited

U.S. PATENT DOCUMENTS

| | | | |
|---|---|---|---|
| 11,762,169 B2 * | 9/2023 | Lobachinsky | G02B 7/003 |
| | | | 359/831 |
| 11,849,262 B2 | 12/2023 | Danziger | |
| 2001/0000124 A1 | 4/2001 | Kollin et al. | |
| 2003/0165017 A1 | 9/2003 | Amitai | |
| 2003/0169504 A1 | 9/2003 | Kaminsky et al. | |
| 2007/0159673 A1 | 7/2007 | Freeman et al. | |
| 2009/0086179 A1 * | 4/2009 | Hult | G03B 27/42 |
| | | | 356/213 |
| 2009/0161191 A1 | 6/2009 | Powell | |
| 2009/0168134 A1 | 7/2009 | Nojima | |
| 2014/0233041 A1 * | 8/2014 | Reitz | G01B 11/002 |
| | | | 356/614 |
| 2016/0062119 A1 | 3/2016 | Fitch et al. | |
| 2016/0282616 A1 | 9/2016 | Matsushita | |
| 2017/0007351 A1 | 1/2017 | Yu | |
| 2017/0227764 A1 | 8/2017 | Kim et al. | |
| 2017/0299860 A1 | 10/2017 | Wall et al. | |
| 2018/0275396 A1 | 9/2018 | Schowengerdt et al. | |
| 2020/0292819 A1 | 9/2020 | Danziger et al. | |
| 2021/0325662 A1 | 10/2021 | Schowengerdt et al. | |

FOREIGN PATENT DOCUMENTS

| | | |
|---|---|---|
| JP | 06-164070 | 6/1994 |
| JP | 07-270711 | 10/1995 |
| JP | 10123623 | 5/1998 |
| JP | 2001066543 | 3/2001 |
| JP | 2006201637 | 8/2006 |
| JP | 4394919 | 1/2010 |
| WO | 2017125875 | 7/2017 |
| WO | 2019131277 | 7/2019 |

* cited by examiner

Axis of horizontal movement of image sensor

30°

Deploy illumination prism assembly
502

Align illumination module and display source with illumination prism assembly
504

Displace display source along displacement axis
506

Translate display source, illumination module, and illumination prism assembly in unison
508

Axis of horizontal movement of image sensor

OPTICAL DEVICE ALIGNMENT METHODS

CROSS-REFERENCE TO RELATED APPLICATIONS

This application claims priority from U.S. Provisional Patent Application No. 62/593,945, filed Dec. 3, 2017, whose disclosure is incorporated by reference in its entirety herein.

TECHNICAL FIELD

The present invention relates to methods and devices for aligning optical devices and systems.

BACKGROUND OF THE INVENTION

During manufacture and assembly of image projecting optical devices, and more specifically, micro-display projectors, it is necessary to align and focus optical components of, and relating to, the optical device to achieve best performance. An example of a micro-display projector is disclosed in U.S. Pat. No. 7,643,214 to Lumus Ltd., wherein a display source and collimating optics are assembled into the micro-display projector. Light waves corresponding to the image to be projected are coupled into a light-guide optical element (LOE) by the micro-display projector that can be placed at the edge of the LOE, and can be configured in eyeglasses, such as embedded in the temple of the eyeglasses, or attached to a head-mounted display apparatus. The coupled-in light waves are guided through the LOE, by total internal reflection, and are coupled-out of the LOE as image light waves by one or more partially reflecting surfaces and into an eye (or eyes) of a user (i.e., viewer).

In conventional focusing and alignment methods, the various optical components of the micro-display projector are moved, relative to each other, via displacement and translations. However, such displacement and translations often result in the display source falling out of alignment with other major components of the micro-display projector, resulting in degradation in illumination uniformity. In addition, conventional focusing and alignment procedures typically rely on an image sensor (i.e., camera) capturing an image corresponding to light waves projected by the micro-display projector. Using the example of the LOE and the micro-display projector disclosed in U.S. Pat. No. 7,643,214, a conventional focusing and alignment procedure would require independently moving the display source of the micro-display projector to focus and align the components of the micro-display projector, coupling light waves from the micro-display projector into the LOE, and capturing the light waves coupled-out of the LOE as an image. However, misalignment of the image sensor and the micro-display projector can lead to misalignment of the components of the micro-display projector. Specifically, if the image sensor is rotated about a principle axis (e.g., optical axis), then the display source will ultimately be incorrectly aligned with other components of the micro-display projector. This is a particular problem when using two optical systems (i.e., two micro-display projectors and two LOEs) with one optical system deployed for each eye of a user, for example, as used in a stereo vision system. If the micro-display projector of each optical system is not properly aligned, each display source will provide an image at a different rotation angle, resulting in an incorrect stereo image.

SUMMARY OF THE INVENTION

The present invention is directed to methods for performing alignment of optical devices and systems.

According to the teachings of an embodiment of the present invention, there is provided a method for aligning and focusing components of an optical device. The method comprises: displacing a display source along a displacement axis to adjust a distance between the display source and a collimating prism assembly, the display source and an illumination module being aligned with an illumination prism assembly such that light waves emitted by the illumination module arrive at the display source via the illumination prism assembly; and translationally moving, in unison, the display source, the illumination prism assembly, and the illumination module in a plane normal to the displacement axis.

Optionally, the translationally moving includes moving the display source, the illumination prism assembly, and the illumination module together as a single unit.

Optionally, the displacing includes moving the display source, the illumination prism assembly, and the illumination module together as a single unit so as to adjust the size of a gap between the illumination prism assembly and the collimating prism assembly.

Optionally, the display source and the illumination prism assembly are aligned so as to produce a gap between the display source and the illumination prism assembly.

Optionally, the displacing includes moving the display source so as to adjust the size of the gap between the display source and the illumination prism assembly.

Optionally, the method further comprises: mechanically coupling the display source to the illumination prism assembly.

Optionally, the method further comprises: mechanically coupling the illumination module to the illumination prism assembly.

Optionally, the method further comprises: mechanically coupling the display source to the illumination prism assembly.

Optionally, the method further comprises: mechanically coupling the collimating prism assembly to the illumination prism assembly.

Optionally, the display source and the illumination module are aligned with the illumination prism assembly such that the display source is positioned along a first component of an optical axis of the illumination prism assembly, and the illumination module is positioned along a second component of the optical axis of the illumination prism assembly that is orthogonal to the first axis.

Optionally, the display source and the illumination module are mechanically coupled to orthogonal surfaces of the illumination prism assembly.

Optionally, the collimating prism assembly and the illumination module are mechanically coupled to orthogonal surfaces of the illumination prism assembly.

Optionally, the method further comprises: mechanically coupling at least one of the display source, the illumination module and the collimating prism assembly to the illumination prism assembly.

Optionally, the mechanically coupling includes cementing one or more slabs of glass between the collimating prism assembly and the illumination prism assembly.

Optionally, the components of the optical device include the electronic display source, the illumination module, the illumination prism assembly, and the collimating prism assembly, and the mechanically coupling including deploying a gel between at least two of the components of the optical device.

Optionally, the method further comprises: mechanically coupling the illumination prism assembly and the illumination module to a mechanical assembly at a known orientation, the mechanical assembly including a test pattern at a known orientation; capturing an image of the test pattern when the image sensor is positioned at a first location in which the image sensor is aligned with the test pattern; analyzing the captured image to determine an estimated orientation of the test pattern; adjusting an orientation parameter of the image sensor based on a comparison between the known orientation of the test pattern and the estimated orientation of the test pattern; and capturing an image projected by the optical device when the image sensor is positioned at a second location in which the image sensor is aligned with the optical device.

There is also provided according to an embodiment of the teachings of the present invention a method for aligning components of an optical device. The method comprises: displacing a display source, an illumination module, and an illumination assembly, along a displacement axis so as to adjust the size of a gap between the illumination prism assembly and a collimating prism assembly, the display source and the illumination module being aligned with the illumination prism assembly such that light waves emitted by the illumination module arrive at the display source via the illumination prism assembly; and translationally moving, in unison, the display source, the illumination prism assembly, and the illumination module in a plane normal to the displacement axis.

There is also provided according to an embodiment of the teachings of the present invention a method for aligning an image sensor with an optical device. The method comprises: mechanically coupling at least one component of the optical device to a mechanical assembly at a known orientation, the mechanical assembly having a test pattern at a known orientation; capturing an image of the test pattern when the image sensor is positioned at a first location in which the image sensor is aligned with the test pattern; analyzing the captured image to determine an estimated orientation of the test pattern; and adjusting an orientation parameter of the image sensor based on a comparison between the known orientation of the test pattern and the estimated orientation of the test pattern.

Optionally, the method further comprises: capturing an image projected by the optical device when the image sensor is positioned at a second location in which the image sensor is aligned with the optical device.

Optionally, the optical device includes an image projecting device and a light waves-transmitting substrate, the method further comprising: coupling light waves, corresponding to an image projected by the image projecting device, into the light waves-transmitting substrate; coupling the coupled-in light waves out of the substrate as image light waves; and capturing the image light waves with the image sensor when the image sensor is positioned at a second location in which the image sensor is aligned with the light waves-transmitting substrate.

Optionally, the orientation parameter of the image sensor includes an angle of rotation about a principle axis of the image sensor.

Optionally, the test pattern is vertically oriented relative to a reference axis.

Optionally, the test pattern is horizontally oriented relative to a reference axis.

Optionally, the test pattern is oriented at an oblique angle relative to a reference axis.

Optionally, the orientation of the test pattern is defined by at least one orientation parameter, and the at least one orientation parameter of the test pattern includes an angular position of the test pattern relative to a reference axis.

Optionally, the test pattern is formed as an aperture in the mechanical assembly.

Optionally, the method further comprises: illuminating the test pattern.

Optionally, the method further comprises: moving the image sensor to the first location prior to capturing the image of the test pattern; and moving the image sensor to the second location after capturing the image of the test pattern.

Optionally, the optical device includes at least a display source, an illumination module, an illumination prism assembly, and a collimating prism assembly.

Optionally, the method further comprises: aligning the illumination module and the display source with the illumination prism assembly such that light waves emitted by the illumination module arrive at the display source via the illumination prism assembly; displacing the display source along a displacement axis to adjust a distance between the display source and the collimating prism assembly; and translationally moving, in unison, the display source, the illumination prism assembly, and the illumination module in a plane normal to the displacement axis.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings.

DESCRIPTION OF THE PREFERRED EMBODIMENTS

Figure 1:
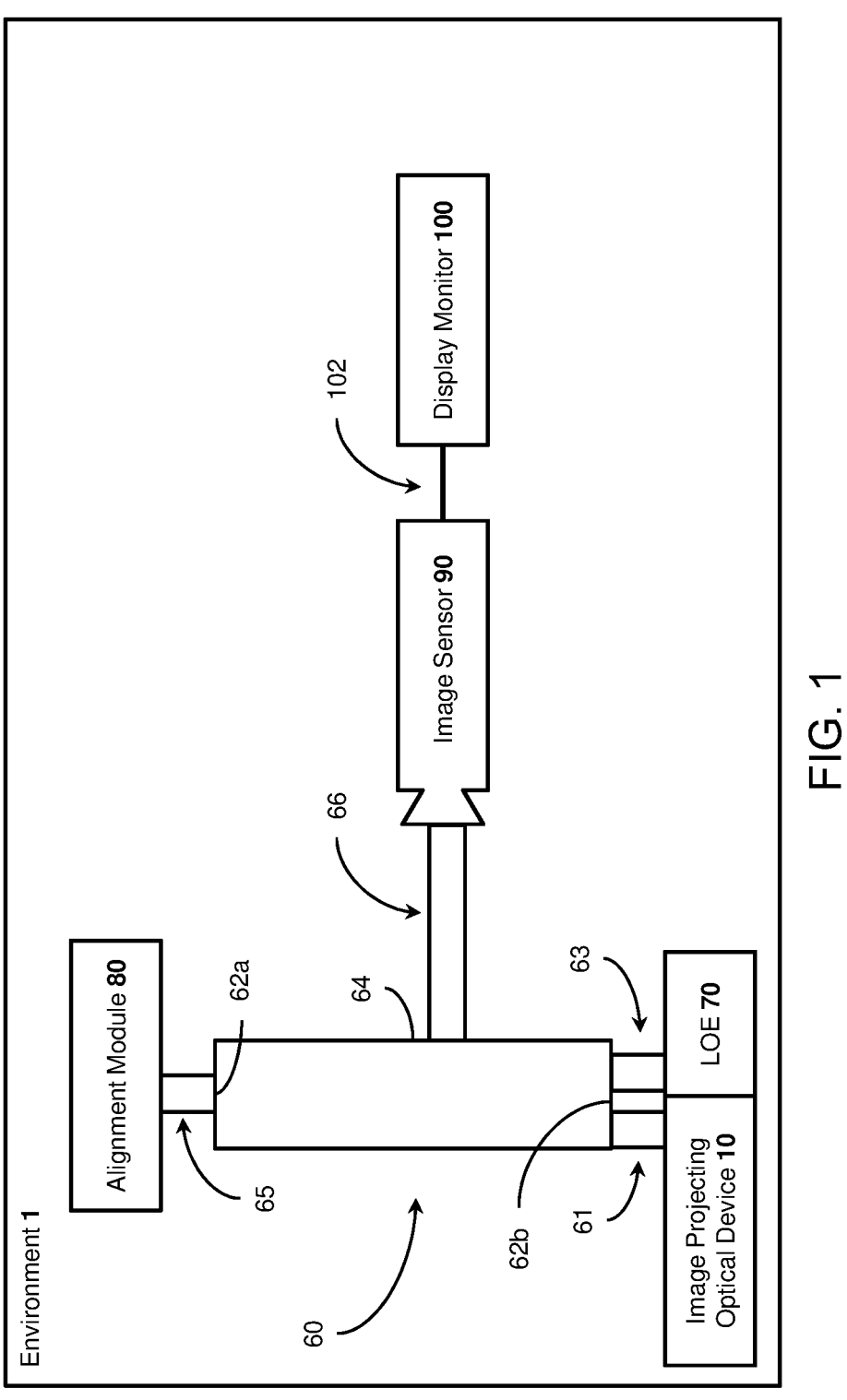
FIG. 1 is a top view illustrating a schematic representation of at least an image projecting optical device, an LOE, an alignment module, an image sensor, and a mechanical assembly, deployed in an example environment in which embodiments of the present disclosure may be performed.

The present invention is directed to methods for performing alignment of optical devices and systems.

The principles and operation of the methods according to present invention may be better understood with reference to the drawings accompanying the description.

Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways. Initially, throughout this document, references are made to directions such as, for example, upper and lower, top and bottom, left and right, and the like. These directional references are exemplary only to illustrate the invention and embodiments thereof.

Overview

Referring now to the drawings, FIG. 1 illustrates a schematic representation of a top view of an image projecting optical device 10, an LOE 70, an alignment module 80, an image sensor and a display monitor 100, deployed in an example environment 1 in which embodiments of the present disclosure may be performed. The environment 1 may be, for example, an optical laboratory test bench with various types of optical, mechanical, and electronic testing equipment.

The environment 1 includes a mechanical assembly 60, to which the image projecting optical device 10 is mechanically attached together with the LOE 70. The mechanical assembly includes one or more attachment mechanisms which hold the LOE 70 at a fixed and known orientation. The LOE 70 is deployed at the fixed and known orientation using calibrated optical test equipment, to ensure proper deployment of the LOE 70. The alignment module 80 is also attached to the mechanical assembly 60 in a fixed and known orientation. A sliding arrangement 66 attaches the image sensor (i.e., camera) 90 to the mechanical assembly 60. The sliding arrangement 66 enables the image sensor 90 to slide between the alignment module 80 and the LOE 70. A first portion (i.e., base portion) of the sliding arrangement 66 slides along a railing deployed on a main portion of the mechanical assembly 60. The image sensor 90 is mechanically attached to the sliding arrangement 66 at a second portion (i.e., distal portion from the base portion) via a mechanical sub-assembly. The mechanical sub-assembly may be implemented as, for example, a platform having one or more joints allowing for rotational three degrees of freedom.

The display monitor 100, implemented, for example, as a liquid crystal display (LCD) or the like, is connected to the image sensor 90 via an interface connection 102. The interface connection 102 can be implemented, for example, as a cable connected to respective input/output ports of the image sensor 90 and the display monitor 100. The display monitor 100 is operative to display images captured by the image sensor 90 for viewing by a user or operator of the environment 1. The display monitor 100 may function as a viewfinder for the image sensor 90, allowing the user or operator to see changes in images captured by the image sensor 90 in response to user initiated mechanical adjustments made to various components of the mechanical assembly 60.

The mechanical assembly 60 may include one or more sub-assemblies, each configured for holding different optical and/or mechanical components. In certain embodiments, the mechanical assembly 60 includes at least three major sub-assemblies, namely a first sub-assembly 61, a second sub-assembly 63, and a third sub-assembly 65. The first sub-assembly 61 holds components of the image projecting optical device 10 and attaches the components of the image projecting optical device 10 to the mechanical assembly 60. The second sub-assembly 63 holds the LOE 70 and attaches the LOE 70 to the mechanical assembly 60. The sub-assemblies 61, 63 are arranged to allow cooperative positioning of the image projecting optical device 10 and the LOE 70, such that the light waves produced by the image projecting optical device 10 are coupled in to the LOE 70. The third sub-assembly 65 holds the alignment module 80 and attaches the alignment module 80 to the mechanical assembly 60.

The sub-assemblies 61, 63, 65 may be implemented in various ways, including, but not limited to, bracket arrangements, gripping arrangements, and pin/screw arrangements. In certain embodiments, the first sub-assembly 61 can be arranged to hold the electronic display source 12, the illumination module 14, and the illumination prism assembly 16, while the second sub-assembly 63 may be arranged to hold the LOE 70 and the collimating prism assembly 18. The mechanical assembly 60, and the corresponding sub-assemblies 61, 63, 65, are arranged to maintain the alignment and orientation of the components of the image projecting optical device 10, the LOE 70, and alignment module 80, respectively. It is noted that the sub-assemblies 61, 63, 65, in particular the first sub-assembly 61, may include one or more sub-components to allow for controlled adjustment of the positioning of the components which are held by the sub-assembly. Such controlled adjustment will be described in detail in subsequent sections of the present disclosure.

Generally speaking, the embodiments of the present disclosure are directed to a two-stage alignment (i.e., calibration) process. In one of the stages, referred to as a focusing and alignment stage, the individual components of the image projecting optical device 10 are focused and aligned such that the image projecting optical device 10 produces a sharp and focused image at the LOE 70 output. The focusing and alignment is performed by moving sub-components of the image projecting optical device 10 while evaluating image quality metrics of images captured by the image sensor 90 at the LOE 70 output until certain performance criteria are met. Prior to performing the steps of the focusing and alignment stage, the image sensor 90 is focused to infinity and positioned across from the LOE 70 (i.e., aligned with the LOE 70) at an eye relief distance from the LOE 70 (for example 18 millimeters), and preferably within an eye motion box, to enable capturing of the image light waves that are coupled out of the LOE 70. The eye motion box is a two-dimensional area in which the eye (or image sensor 90) has a full field of view (FOV) of the image light rays coupled out of the LOE 70, which correspond to the entire input image, generated by the image projecting optical device 10, that is coupled into the LOE 70. In this way, the image sensor 90 acts as the human eye, and the images displayed on the display monitor 100 act as the images that would be seen by the eye of the viewer when using the optical device/system (i.e., the LOE 70 together with the image projecting optical device 10), for example when the viewer wears eyeglasses into which the image projecting optical device 10 and the LOE 70 are embedded.

In the other stage, referred to as an orientation alignment stage, the orientation of the image sensor 90 is adjusted so as to align with the orientation of the alignment module 80, which is linked to the alignment orientation of the LOE 70. The alignment of the image sensor 90 with the alignment module 80 allows for proper execution of the focusing and alignment stage, in which the components of the image projecting optical device 10 are aligned and focused.

Figures 2, 3A:
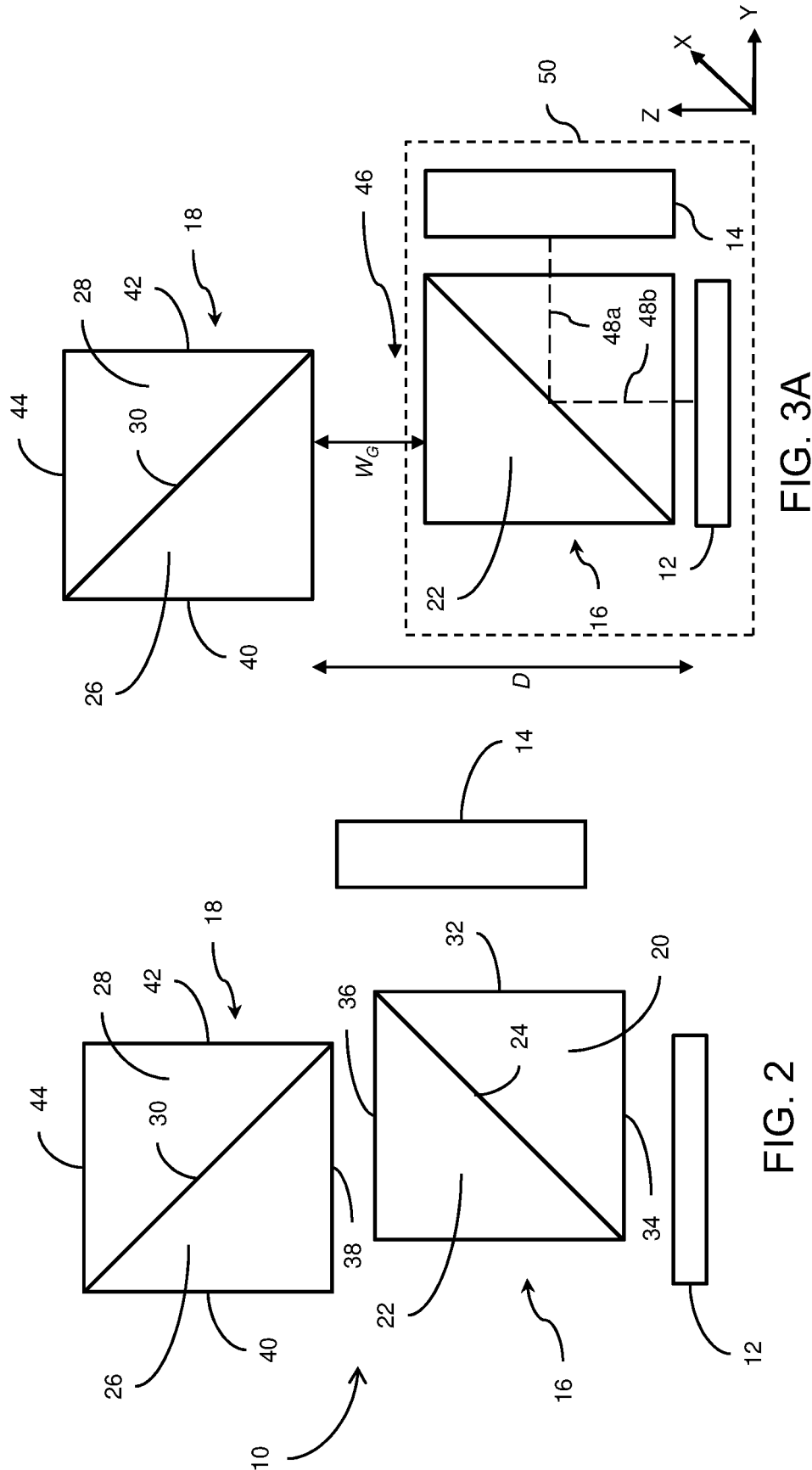
FIG. 2 is a sectional view illustrating a schematic representation of components of an image projecting optical device having an electronic display source, an illumination module, an illumination prism assembly, and a collimating prism assembly, that can be deployed in the example environment of FIG. 1.
FIG. 3A is a sectional view similar to FIG. 2, showing the illumination prism assembly and the collimating prism assembly deployed in spaced relation, according to an embodiment of the present disclosure.

With continued reference to FIG. 1, refer now to FIG. 2, a sectional view illustrating a schematic representation of components of a non-limiting example of the image projecting optical device 10 for which the focusing and alignment methods according to embodiments of the present disclosure are to be performed. Generally speaking, the image projecting optical device 10 includes an electronic display source 12, an illumination module 14, an illumination prism assembly 16, and a collimating prism assembly 18. In a non-limiting implementation, the electronic display source 12 is implemented as a liquid crystal on silicon (LCoS) micro-display.

The illumination module 14 includes a light source and is configured to transmit light in order to illuminate the image area of the electronic display source 12. The illumination module 14 may be implemented in various ways, and may be a polarized or unpolarized light source. Examples of non-limiting implementations of the light source of the illumination module 14 include, but are not limited to, a light emitting diode (LED), a light pipe with red-green-blue (RGB) LEDs for color mixing, multiple LEDs that each emit a different color in combination with dichroic mirrors for color mixing, a diode laser, and multiple diode lasers that each emit a different color in combination with dichroic mirrors for color mixing.

According to certain non-limiting implementations, such as the implementation illustrated in FIG. 2, the light source of the illumination module 14 is a polarized light source, and more specifically is a source that produces s-polarized light waves. The illumination prism assembly 16 receives the s-polarized light waves from the illumination module 14 through a light-transmissive surface 32 of a first prism 20 of the illumination prism assembly 16. The received s-polarized light waves are reflected off of a p-polarization transmissive polarizing beamsplitter 24 (which transmits p-polarized light and reflects s-polarized light) and coupled out of the illumination prism assembly 16 toward the electronic display source 12 through a light-transmissive surface 34 of the first prism 20. The polarizing beamsplitter 24 is positioned between a slant edge of the first prism 20 and a slant edge of a second prism 22 of the illumination prism assembly 16. In response to the received illumination of the s-polarized light waves at the image area of the electronic display source 12, the electronic display source 12 is stimulated (i.e., activated) to generate corresponding pixel output in the form of p-polarized light waves emanating from the active pixels of the electronic display source 12. The p-polarized light waves from the electronic display source 12 are coupled into the illumination prism assembly 16 through the light-transmissive surface 34 and pass through the polarizing beamsplitter 24. The p-polarized light waves are then coupled out of the illumination prism assembly 16 through a light-transmissive surface 36 of the second prism 22 and toward the collimating prism assembly 18.

Prior to being coupled into the collimating prism assembly 18 the light waves may pass through a half-wavelength retardation plate (not shown) to convert the p-polarized light waves to s-polarized light waves.

According to certain non-limiting implementations, such as the implementation illustrated in FIG. 2, the s-polarized light waves are coupled into the collimating prism assembly 18 through a light-transmissive surface 38 of a first prism 26 of the collimating prism assembly 18. The coupled-in s-polarized light waves reflect off of a p-polarization transmissive polarizing beamsplitter 30 (which transmits p-polarized light and reflects s-polarized light) that is positioned between a slant edge of the first prism 26 and a slant edge of a second prism 28 of the collimating prism assembly 18. Although not shown in the drawings, collimating lenses, together with quarter-wavelength retardation plates, may be positioned at opposing light-transmissive surfaces 40, 42 of the prisms 26, 28 so as to act to collimate the light waves that ultimately exit the collimating prism assembly 18. Accordingly, the s-polarized light waves reflect off of the polarizing beamsplitter 30, are coupled out of the collimating prism assembly 18 through the light-transmissive surface 40, pass through a quarter-wavelength retardation plate, are reflected by a collimating lens, return to pass again through the quarter-wavelength retardation plate (thereby converting the light waves to p-polarized light waves), and re-enter the collimating prism assembly 18 through the light-transmissive surface 40. The p-polarized light waves then pass through the polarizing beamsplitter 30, are coupled out of the collimating prism assembly 18 through the light-transmissive surface 42, pass through a quarter-wavelength retardation plate, are reflected by a collimating lens, return to pass again through the quarter-wavelength retardation plate (thereby converting the light waves to s-polarized light waves), and re-enter the collimating prism assembly 18 through the light-transmissive surface 42. The now s-polarized light waves are reflected off of the polarizing beamsplitter 30 and are coupled out of the collimating prims assembly 18 through a light-transmissive surface 44 of the second prism 28, where they may be coupled into a light-transmissive substrate (e.g., LOE) and ultimately coupled out of the substrate into the eye of a viewer. The coupling-in of light waves may be accomplished via an in-coupling optical surface (e.g., a wedge-shaped prism or an angled reflecting surface) that interfaces the collimating prism assembly 18 and the LOE input.

Note that for each instance where a particular polarized wave path has been followed in the examples described above, the polarizations are interchangeable. In other words, on altering the orientation of the polarizing beamsplitters, each mention of p-polarized light could be replaced by s-polarized light, and vice versa. As such, the specific use of the particular beamsplitters in the illumination prism assembly 16 and the collimating prism assembly 18 in the examples described above are not intended to be limiting, are provided for illustrative purposes in order to better describe the operation of the image projecting optical device 10.

Also note that the light-transmissive surfaces of the prisms of the illumination prism assembly 16 and the collimating prism assembly 18 described above are generally planar surfaces. As should be apparent, the light-transmissive surfaces 34, 36, 38, 44 are parallel to each other (i.e., are in parallel planes), and are orthogonal to the light-transmissive surface 32.

Although it should be noted that the components of the image projecting optical device are not necessarily drawn to scale in FIG. 2, it should be clear from FIG. 2 that the electronic display source 12, the illumination module 14, the illumination prism assembly 16, and the collimating prism assembly 18 are out of alignment, causing non-uniformity of the illumination of the electronic display source 12, and ultimately resulting in a non-uniform and defocused image. Accordingly, focusing and alignment of the major components of the image projecting optical device 10 should be performed to ensure uniformity of the illumination of the electronic display source 12. The following paragraphs describe the focusing and alignment stage in detail.

Focusing and Alignment Stage

Figure 3C:
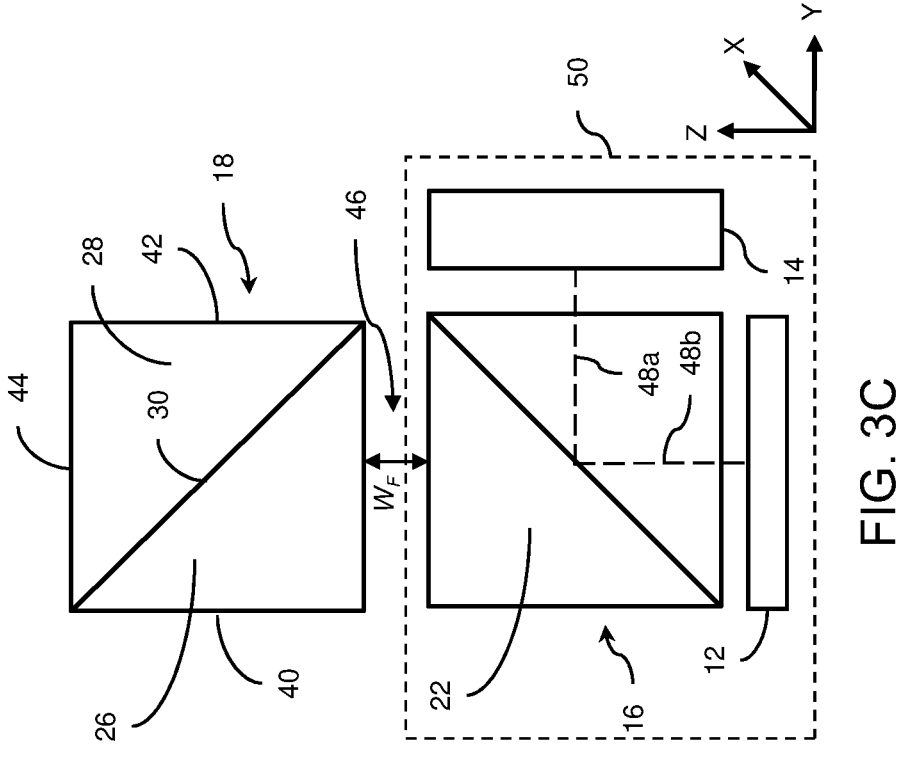
FIG. 3C is a sectional view similar to FIG. 3B, showing the electronic display source, illumination module, and illumination prism assembly translated relative to the collimating prism assembly, according to an embodiment of the present disclosure.
Figure 3B:
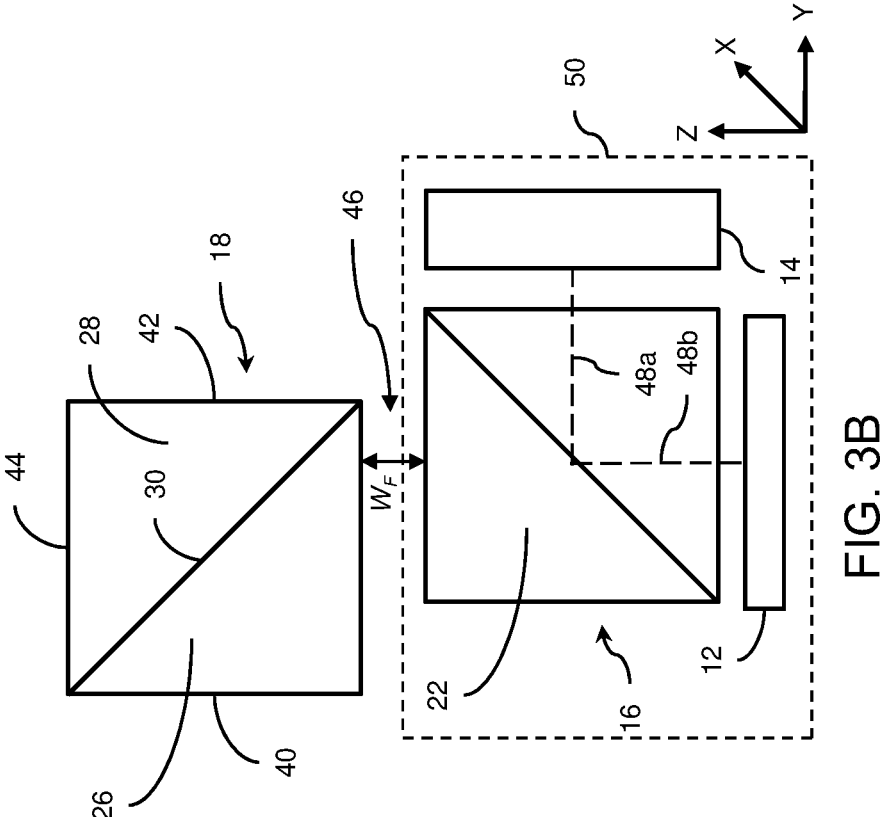
FIG. 3B is a sectional view similar to FIG. 3A, showing the electronic display source, illumination module, and illumination prism assembly displaced relative to the collimating prism assembly, according to an embodiment of the present disclosure.

Referring now to FIGS. 3A-3C, focusing and alignment of the components of the image projecting optical device 10 according to an embodiment of the present disclosure. In FIG. 3A, the illumination prism assembly 16 is deployed in spaced relation relative to the collimating prism assembly 18 so as to produce and provide a gap 46 between the illumination prism assembly 16 and the collimating prism assembly 18. The size of the gap 46 is measured as the shortest distance between the light transmissive surfaces 36, 38 (i.e., the distance along the line that is normal to, and bounded by, the light transmissive surfaces 36, 38). In certain embodiments, the gap 46 is a spatial gap implemented as an air gap, while in other embodiments the gap 46 is implemented as a light-transmissive gel deployed between the light-transmissive surfaces 36, 38. In yet other embodiments, the gap 46 is implemented as a combination of an air gap and an optical component, for example, a lens that is optically attached to the light-transmissive surface 38 of the collimating prism assembly 18.

The initial size of the gap 46 may vary depending on how the components of the image projecting optical device 10 are initially assembled. In typical configurations, the size of the gap 46 is less than 1 millimeter, and in common implementations is approximately 0.5 millimeters. The initial gap size (i.e., width) is denoted as W G in FIG. 3A. The illumination module 14 is mechanically attached to the illumination prism 16 at the light-transmissive surface 32. The mechanical attachment is made via an alignment mechanism that in certain embodiments is a sub-component of the first sub-assembly 61 of the mechanical assembly 60. The alignment mechanism also aligns the illumination module 14 with the nominal optical axis of the image projecting optical device 10.

In general terms, the optical axis of the image projecting optical device 10 is defined in part by the illumination prism assembly 16, and further in part by the collimating prism assembly 18. The optical axis of the image projecting optical device 10 includes multiple components, which as illustrated in FIG. 3A includes a first component 48a of the optical axis and a second component 48b of the optical axis that is orthogonal to the first component 48a. The first component 48a is normal to the plane in which the light-transmissive surface 32 lies, and the second component 48b is normal to the plane in which the light-transmissive surface 34 lies.

As such, the aforementioned alignment mechanism aligns the illumination module 14 with the first component 48a of the optical axis. The electronic display source 12 is aligned, via an alignment mechanism, to the second component 48b. The same alignment mechanism may be used to align the electronic display source 12 and the illumination module 14. Alternatively, the alignment mechanism that aligns the electronic display source 12 may be a sub-component of the first sub-assembly 61 that is a different sub-component from the alignment mechanism that aligns the illumination module 14.

The electronic display source 12 and the illumination module 14 are aligned with the illumination prism assembly 16 such that the light waves emitted by the illumination module 14 reflect off of the polarizing beamsplitter 24 and arrive at the image area of the electronic display source 12 so as to uniformly illuminate the electronic display source 12. The image area of the electronic display source 12 is generally located at a central region of the front portion of the electronic display source 12 (i.e., the center of the LCoS). The alignment of the electronic display source 12 may include moderately tilting or rotating the electronic display source 12 about the X-axis, and/or Y-axis, and/or the Z-axis.

The electronic display source 12 may be attached (for example via optical cement) to the light-transmissive surface 34 of the first prism 20. Alternatively, the electronic display source 12 may be held mechanically in place next to the light-transmissive surface 34 of the first prism 20 with or without an air gap provided between the electronic display source 12 and the light-transmissive surface 34 of the first prism 20. The electronic display source 12 may be help mechanically by a sub-component of the first sub-assembly 61.

The electronic display source 12, the illumination module 14, and the illumination prism assembly 16 are displaced (i.e., shifted), in unison as a single unit 50 (i.e., single mechanical unit of the first sub-assembly 61, demarcated by dashed lines), along a displacement axis that is colinear with the second component 48*b*, which in FIGS. 3A-3C is the Z-axis. By equivalence, the displacement occurs along a line that is normal to the light-transmissive surface 34 of the first prism 20. The displacing action effectively moves the electronic display source 12 closer to, or further away from, the collimating prism assembly 18, thereby adjusting the shortest linear distance between the electronic display source 12 and the collimating prism assembly 18. The linear distance, denoted as D in FIG. 3A, is a direct function of the size of the gap 46 introduced by the deployment of the illumination prism 16. Specifically, the linear distance D is approximately equal to the sum of the gap width $W_G$, the width of the illumination prism assembly 16 (i.e., the shortest distance between the transmissive surfaces 34 and 36), and the distance between the front panel of the electronic display source and the illumination prism assembly 16. In embodiments in which the electronic display source 12 is cemented to the light-transmissive surface 34 of the first prism 20, the distance between the front panel of the electronic display source 12 and the illumination prism assembly 16 is approximately equal to the layer thickness of the optical cement used to attach the electronic display source 12 to the light-transmissive surface 34.

As the linear distance changes, the size of the gap 46 also changes, as does the position of the focal plane of the image projecting optical device 10. As the position of the focal plane changes, the focus of the image, projected by the image projecting optical device 10, and captured by the image sensor 90 at the output of the LOE 70, also changes. The displacing action is performed while evaluating an image quality metric, more specifically focus quality, of the captured image, and is performed until a best focus of the captured image is achieved. The image quality metric (i.e., focus quality) of the image may be evaluated, for example, via image processing techniques and methods (performed by a computerized processor, e.g., an image processor), to provide an indication of the distance adjustment (i.e., between the electronic display source 12 and the collimating prism assembly 18) required in order to achieve best focus.

The image processing techniques may include, for example, evaluating the modulation transfer function (MTF) at the detector of the image sensor 90. Alternatively, or in combination with image processing techniques, the focus quality may be visually evaluated by the operator of the environment 1 by viewing the images, from the image sensor 90, displayed on the display monitor 100. Accordingly, as the operator displaces the electronic display source 12 so as to adjust the position of the focal plane, the MTF and/or the focus of the image displayed on the display monitor 100 changes. The displacement of the electronic display source 12 is continued until the focal plane is at a position in which the MTF indicates that the image is in focus and/or the operator views a focused image on the display monitor 100.

FIG. 3B shows the electronic display source 12, the illumination module 14, and the illumination prism 16 subsequent to the linear displacement to achieve best focus, in which the size of the gap 46 is reduced to a value of less than W G as a result of movement of the single unit closer to the collimating prism assembly 18. The size of the gap 46, after achieving best focus, is denoted as $W_F$ in FIG. 3B.

Once the distance between the electronic display source 12 and the collimating prism assembly 18 is properly adjusted to ensure best focus, the unit 50 is translationally moved. The unit 50 is translationally moved relative to the light-transmissive surface 38 of the collimating prism assembly 18, and in the plane normal to the displacement axis, which in FIGS. 3A-3C is the XY-plane. In other words, the unit 50 is translated in a plane parallel to the plane of the light-transmissive surfaces 34, 36, 38. The translational movement of the single unit 50 in the XY-plane is performed without rotation (i.e., without rotation about the displacement axis (i.e., the Z-axis) or the X-axis or the Y-axis). The translation is performed so as to maintain the alignment of the electronic display source 12 and the illumination module 14 with the illumination prism assembly 16, and to maintain line of sight (LoS) of the optical system (i.e., between the image projecting optical device 10 and the LOE 70). Within the context of this document, the term "LoS" generally refers to when there is a correspondence between the appropriate individual pixels of the LOE 70 output image and the active pixels of the image area of the electronic display source 12. When LoS is maintained, the image sensor 90, when positioned in the eye motion box at the eye relief distance, captures the entire image (i.e., full FOV) projected by the LOE 70. For example, LoS may not be achieved if the unit 50 is translationally offset from the collimating prism assembly 18 by more than an allowed amount. In such instances, some of the pixels of the source image (i.e., from the electronic display source 12) may not reach the LOE 70 output even when the image sensor 90 is within the eye motion box, the results of which may be manifested in a cutoff image when viewing the LOE 70 output image on the display monitor 100 (or equivalently when the image light waves are coupled out of the LOE 70 and into the eye(s) of a viewer).

FIG. 3C shows the components of the image projecting optical device 10 subsequent to translational movement in the XY-plane. The LoS may be evaluated via image processing techniques (performed by a computerized processor, e.g., an image processor), or may be visually evaluated by the user by viewing the output images from the LOE 70, captured by the image sensor 90, displayed on the display monitor 100. For example, while the LOE 70 output image is viewed by the user on the display monitor 100, the unit 50 may be translated in the XY-plane until appropriate pixel matching, corresponding to the desired LoS, is achieved. By translating the electronic display source 12, the illumination module 14, and the illumination prism assembly 16 together as a single unit, uniform illumination of the electronic display source 12 by the illumination module 14 (via the illumination prism assembly 16) is maintained. As such, the center of the electronic display source 12 is illuminated throughout the duration of the translational movement in the XY-plane.

After the translational movement of the single unit 50 is complete, the illumination prism assembly 16 and the collimating prism assembly 18 may be optically attached to each other at light-transmissive surfaces 36, 38, for example via optical cement. As a result, the major components of the image projecting optical device 10 are connected to each other, either directly or indirectly.

Although embodiments of the disclosure described thus far have pertained to displacing and translating the electronic display source 12 together with the illumination module 14 and the illumination prism assembly 16 as a single unit, other embodiments are possible in which the electronic display source 12 is displaced independently from the illumination module 14 and the illumination prism assembly 16.

Figures 4A, 4B:
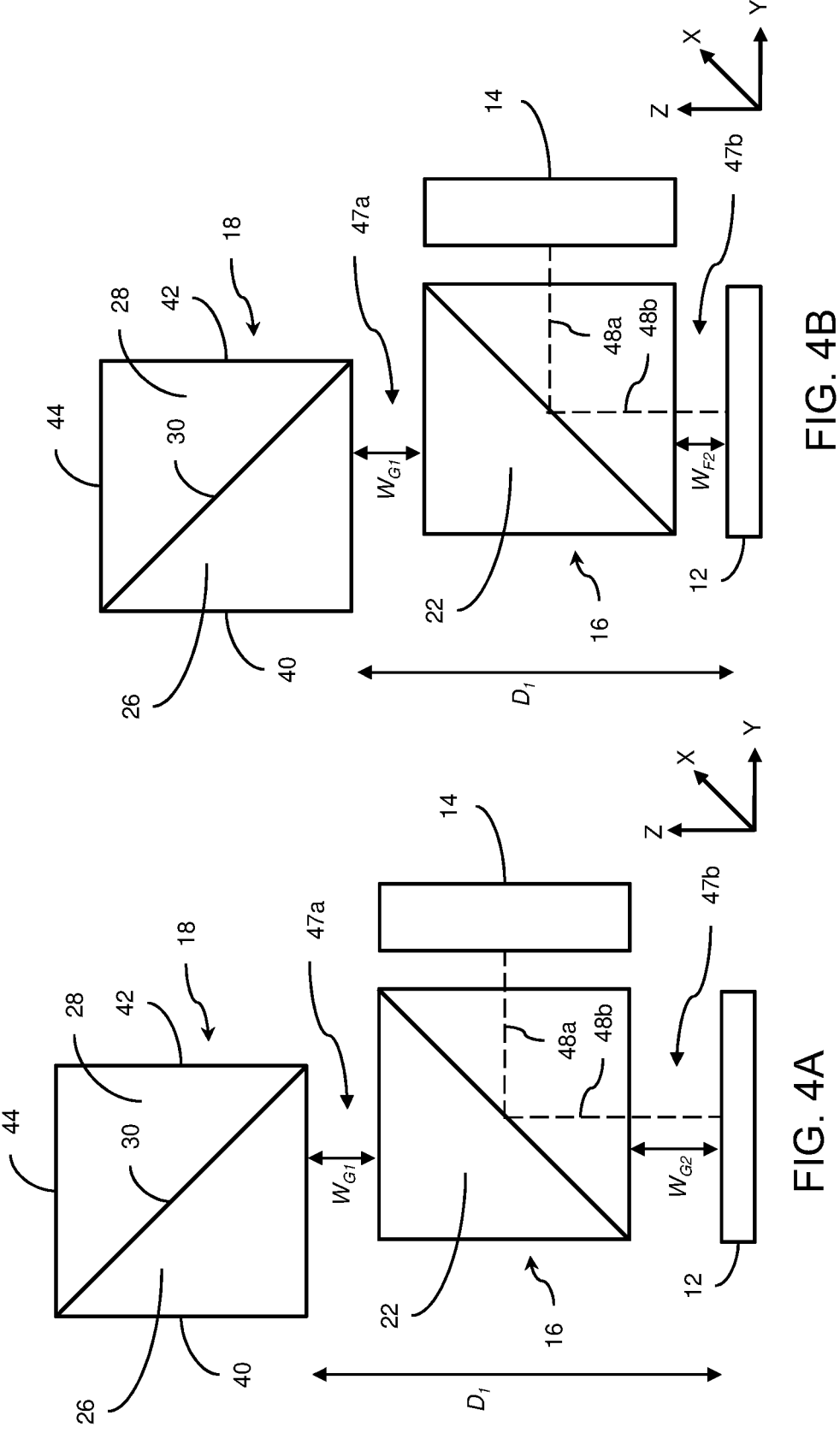
FIG. 4A is a sectional view similar to FIG. 3A, showing the electronic display source, the illumination prism assembly, and the collimating prism assembly deployed in spaced relation, according to an embodiment of the present disclosure.
FIG. 4B is a sectional view similar to FIG. 4A, showing the electronic display source displaced relative to the illumination prism assembly, according to an embodiment of the present disclosure.

Refer now to FIGS. 4A-4B, focusing and alignment of the components of the image projecting optical device 10 according to another embodiment of the present disclosure. In FIG. 4A, the electronic display source 12 and the illumination prism assembly 16 are deployed in spaced relation relative to the collimating prism assembly 18 so as to produce and provide two gaps, namely a first gap 47a and a second gap 47b. The first gap 47a is provided between the illumination prism assembly 16 and the collimating prism assembly 18, similar to the gap 46 described in the embodiments with reference to FIGS. 3A-3C, and should be understood by analogy thereto. The second gap 47b is provided between the electronic display source 12 and the illumination prism 16. The size of the second gap 47b is measured as the shortest distance between the front panel of the electronic display source 12 and the light-transmissive surface 34 (i.e., the distance along the line that is normal to, and bounded by, front panel of the electronic display source 12 and the light-transmissive surface 34). In certain embodiments, the second gap 47b is a spatial gap implemented as an air gap.

The initial sizes of the gaps 47a, 47b may vary depending on how the components of the image projecting optical device 10 are initially assembled. In FIG. 4A the initial size (i.e., width) of the first gap 47a is denoted as $W_{G1}$ and the initial size of the second gap 47b is denoted as $W_{G2}$.

The electronic display source 12 and the illumination module 14 are aligned with the illumination prism assembly 16 such that the light waves emitted by the illumination module 14 reflect off of the polarizing beamsplitter 24 and arrive at the image area of the electronic display source 12 so as to uniformly illuminate the electronic display source 12. In addition to aligning the illumination module 14 with the illumination prism assembly 16, the illumination module 14 is mechanically attached to the illumination prism assembly 16 at the light-transmissive surface 32 via a sub-component of the first sub-assembly 61.

The electronic display source 12 is then displaced along the displacement axis (i.e., the axis colinear with the second component 48b, i.e., the axis that is orthogonal to the light-transmissive surface 34) while the illumination module 14 and the illumination prism assembly 16 are held in place (i.e., are static). The electronic display source 12 is displaced to adjust the size of the second gap 47b. The displacing action effectively moves the electronic display source 12 closer to, or further away from, the illumination prism assembly 16 and the collimating prism assembly 18, thereby adjusting the shortest linear distance between the electronic display source 12 and the collimating prism assembly 18. The linear distance, denoted as $D_1$ in FIG. 4A, is a direct function of the size of the gaps 47a, 47b. Specifically, the linear distance $D_1$ is approximately equal to the sum of the gap widths $W_{G1}$ and $W_{G2}$, and the width of the illumination prism assembly 16 (i.e., the shortest distance between the transmissive surfaces 34 and 36.

Similar to as described above with reference to FIGS. 3A-3C, the electronic display source 12 is displaced until best focus is achieved. FIG. 4B shows the electronic display source 12 subsequent to the linear displacement to achieve best focus, in which the size of the second gap 47b is reduced to a value of less than $W_{G2}$ as a result of movement of the electronic display source 12 closer to the collimating prism assembly 18. As shown in FIG. 4B, the size of the first gap 47a remains unchanged. The size of the second gap 47b, after achieving best focus, is denoted as $W_{F2}$ in FIG. 4B.

Once best focus is achieved, the electronic display source 12 is mechanically attached to the illumination prism assembly 16 at the light-transmissive surface 34. The mechanical attachment may be effectuated by one or more sub-components of the first sub-assembly 61. The electronic display source 12, the illumination module 14, and the illumination prism assembly 16 are then translated, as a single unit (i.e., unit 50), in the XY-plane, so as to maintain the desired LoS, in a manner similar to as described with reference to FIG. 3C.

In certain embodiments, displacement along the displacement axis may be initiated so as to adjust the size of both gaps 47a and 47b. In such embodiments, the electronic display source 12 is displaced to adjust the size of the second gap 47b, while the illumination prism assembly 16 is displaced along the displacement axis (i.e., the Z-axis), together with the illumination module 14, to adjust the size of the first gap 47a.

The embodiments described with reference to FIGS. 3A-3C has certain advantages over methods that rely on using gaps close to the electronic display source 12, for example, in the embodiments described with reference to FIGS. 4A-4B. One such advantage is that the image projecting optical device 10 performs better optically when there is no gap between the electronic display source 12 and the illumination prism assembly 16 (i.e., the second gap 47b). By not having a gap close to the electronic display source 12, the area close to the focal plane of the image projecting optical device 10 remains clean and free from contaminants.

As discussed above, the major components of the image projecting optical device 10 are connected to each other, either directly or indirectly. The connections are effectuated by mechanical attachment of the major components via one or more sub-components of the first sub-assembly 61. In certain embodiments, the mechanical attachment between the illumination prism assembly 16 and the collimating prism assembly 18 is effectuated by one or more glass slabs that are cemented to the light-transmissive surfaces 36, 38. In other embodiments, a light-transmissive gel is placed between adjacent components of the image projecting optical device in order to fill unwanted gaps between such components. For example, the gel may be deployed between the illumination module 14 and the illumination prism assembly 16.

Figures 5, 6, 8:
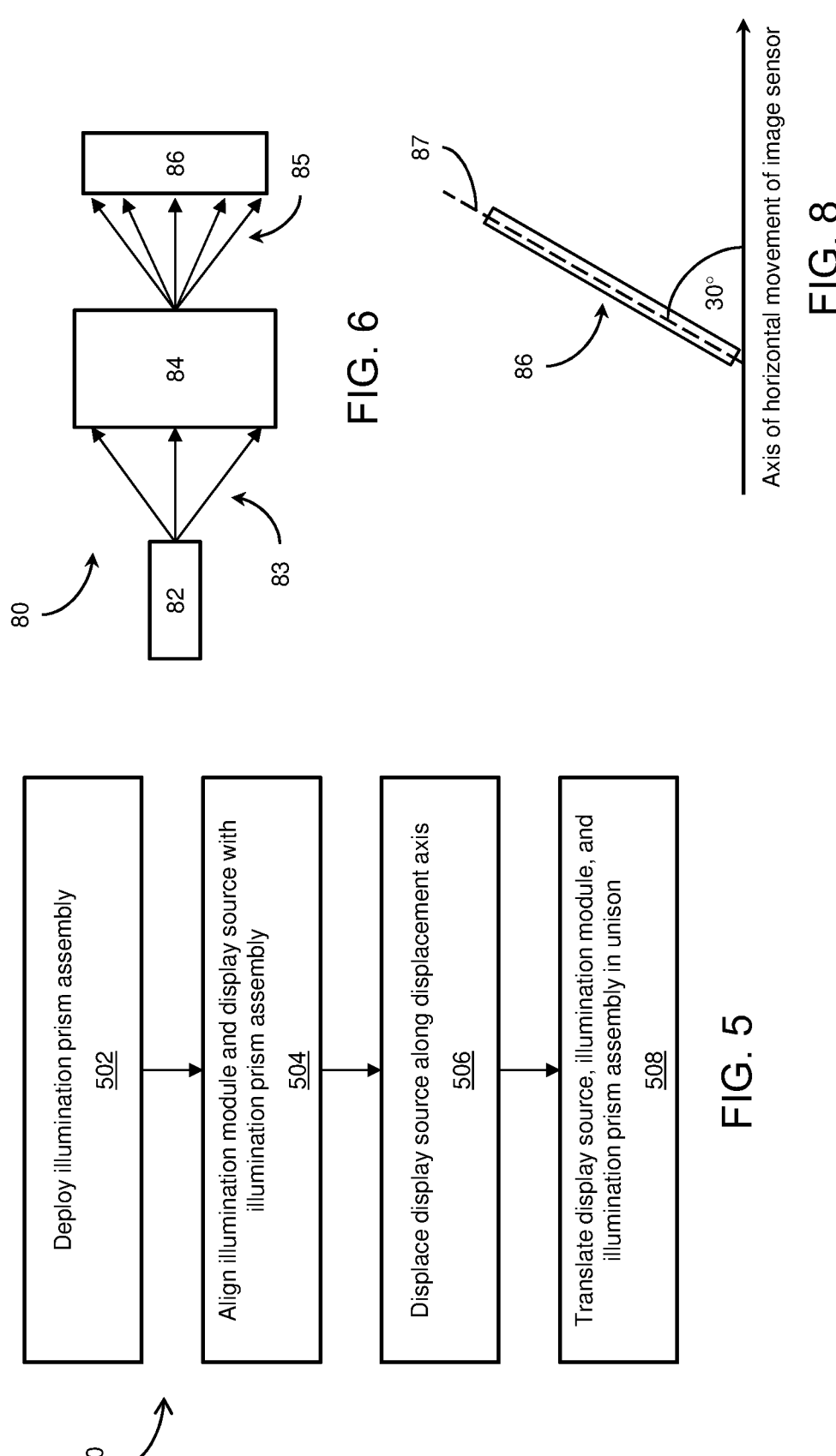
FIG. 5 is a flow diagram illustrating a process for performing focusing and alignment of the components of the image projecting optical device, according to embodiments of the present disclosure.
FIG. 6 is a sectional view illustrating a schematic representation of an alignment module used to perform orientation alignment of an image sensor, according to an embodiment of the present disclosure.
FIG. 8 is a schematic representation of a slit of the alignment module, deployed at an angle relative to the axis of motion of the image sensor, according to an embodiment of the present disclosure.

Attention is now directed to FIG. 5 which shows a flow diagram detailing a process 500 in accordance with the disclosed subject matter. The process 500 includes steps for focusing and aligning the components of the image projecting optical device 10. Some of the sub-processes of the process 500 may be performed manually by an operator of the environment 1 or may be performed automatically by various mechanical and computerized components, such as processors and the like.

The process 500 begins at block 502, where the illumination prism assembly 16 is deployed relative to the collimating prism assembly 18 so as to produce a gap (i.e., the gap 46, or the first gap 47b) between the illumination prism assembly 16 and the collimating prism assembly 18. The process 500 then moves to block 504, where the illumination module 14 and the electronic display source 12 are aligned with the illumination prism assembly 16 such that the light waves emitted by the illumination module 14 arrive at the image area of the electronic display source 12, via reflection off of the polarizing beamsplitter 24, so as to uniformly illuminate the electronic display source 12. The aligning step includes positioning the electronic display source 12 along the first component 48a of the optical axis of the illumination prism assembly 16 such that the first component 48a passes through the center of the electronic display source 12, and positioning the illumination module 14 along the second component 48b of the optical axis of the illumination prism assembly 16 such that the second component 48b passes through the center of the illumination module 14.

In certain embodiments, the aligning performed in block 504 includes mechanically attaching the electronic display source 12 and the illumination module 14 to respective surfaces of the illumination prism assembly 16 (i.e., the orthogonal light-transmissive surfaces 32, 34). In other embodiments, the aligning performed in block 504 includes producing a gap (i.e., the second gap 47b) between the electronic display source 12 and the illumination prism assembly 16.

The process 500 then moves to block 506, where the electronic display source 12 is displaced along the displacement axis (i.e., the Z-axis) to adjust the distance between the electronic display source 12 and the collimating prism assembly 18 in order to achieve best focus. In other words, by displacing the electronic display source 12, the position of the focal plane of the image projecting optical device 10 is adjusted. The focal plane position is adjusted while image quality metrics are evaluated (e.g., MTF) in order to achieve best (i.e., optimal) or near-best focus of the image projected by the image projecting optical device 10. In certain embodiments, the electronic display source 12 is displaced together with the illumination module 14 and the illumination prism assembly 16, such they are displaced in unison, together as a single unit.

In other embodiments, the electronic display source 12 is displaced alone while the illumination module 14 and the illumination prism assembly 16 remain static. In such embodiments, the electronic display source 12 is mechanically attached to the illumination prism assembly 16 subsequent to performing the displacing of block 506.

As discussed above, the best focus may be determined by evaluating the focus quality of the image (captured by the image sensor 90 at the LOE 70 output), via image processing techniques and methods, such as, for example, determining the MTF.

The process 500 then moves to block 508, where the electronic display source 12, the illumination module 14, and the illumination prism 16 are translated in unison in the XY-plane in order to maintain the desired LoS. The LoS may be evaluated via image processing techniques. As discussed above, in certain embodiments the translational movement is effectuated by moving the electronic display source 12, the illumination module 14, and the illumination prism 16 together as a single unit.

As mentioned above, the embodiments directed to methods for performing focusing and alignment of the components of the image projecting optical device 10 constitutes one stage (referred to as the focusing and alignment stage) of a two-stage process. The other stage, referred to as the orientation alignment stage, is performed in order to ensure that the image sensor 90 is properly aligned with the image projecting optical device 10, so that the images captured by the image sensor 90 during execution of the method steps of the focusing and alignment stage enable proper alignment of the electronic display source 12 with the remaining components of the image projecting optical device 10. The following paragraphs describe the orientation alignment stage in detail.

Orientation Alignment Stage

Referring again to FIG. 1, the alignment module 80 is attached to the mechanical assembly 60 at a first portion 62a thereof via the third sub-assembly 65. The image projecting optical device 10 and the LOE 70 are mechanically attached to the mechanical assembly 60 at a second portion 62b thereof via the first sub-assembly 61 and the second sub-assembly 63, respectively. The image projecting optical device 10, the LOE 70, and the alignment module 80 are held in known fixed orientations by the respective sub-assemblies 61, 63, 65.

In certain embodiments, the mechanical assembly 60 includes a central portion 64 that provides physical separation between the two portions 62a, 62b. The two portions 62a, 62b may be located at opposite ends of the mechanical assembly 60, separated by the central portion 64.

The image sensor 90 is attached to the mechanical assembly 60 via the sliding arrangement 66. The sliding arrangement 66 is operative to slide horizontally between two positions so as to alternately align the image sensor 90 with the LOE 70 and the alignment module 80.

With continued reference to FIG. 1, refer now to FIG. 6 a sectional view illustrating a schematic representation of the alignment module 80 according to an embodiment of the present disclosure. The alignment module 80 includes a test pattern 86. In a preferred but non-limiting implementation, the test pattern 86 is implemented as a generally rectangular slit (i.e., an elongated aperture) formed in a base surface of the alignment module 80. In other embodiments, the test pattern 86 can be a printed pattern, for example, an elongated rectangular pattern, printed on a base surface of the alignment module 80. In certain embodiments, the alignment module 80 is a component of the mechanical assembly 60, and therefore the test pattern 86 may be considered as a portion of the mechanical assembly 60, formed as an aperture or an opening in the mechanical assembly 60.

The test pattern 86 is positioned at a fixed and known orientation with respect to the mechanical assembly 60. The orientation of the test pattern 86 is defined by one or more orientation parameters. According to embodiments of the present disclosure, the angle of the central axis of the test pattern 86 relative to a reference axis defines the main orientation parameter. In implementations in which the test pattern is implemented as a rectangular slit, the central axis is the long line of reflectional symmetry of the rectangle. The reference axis may be, for example, the axis of horizontal movement of the image sensor 90, which is the plane of the paper in FIG. 6, or may be the vertical axis that is normal to the axis of horizontal movement of the image sensor 90. As will described in greater detail below, the image sensor 90 is operative to capture one or more images of the test pattern 86 when the image sensor 90 is aligned with the alignment module 80 in order to allow estimation of the orientation parameter (i.e., angle) of the test pattern 86 via image processing algorithms.

In certain embodiments, such as the non-limiting embodiment illustrated in FIG. 6, the test pattern 86 is illuminated from the back in order to produce a clearer and sharper image of the test pattern 86. In such embodiments, a diffuser 84 is deployed between the test pattern 86 and a light source 82, implemented, for example, as one or more light emitting diodes (LEDs). Light waves (represented schematically as light rays 83) emanating from the light source 82 are scattered by the diffuser 84. The scattered light waves (represented schematically as light rays from the diffuser 84 illuminate the back of the test pattern 86.

Figures 7A, 7B:
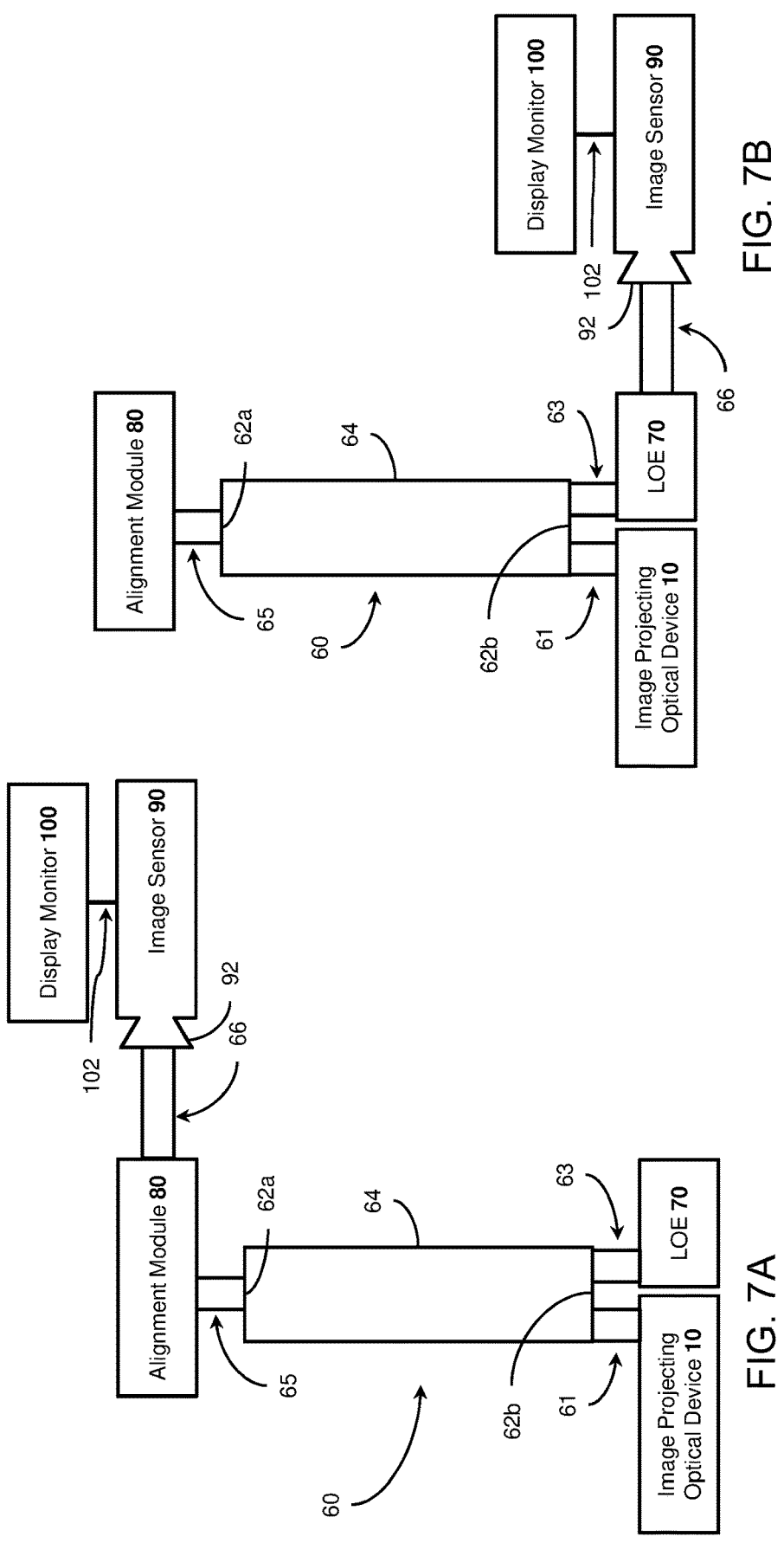
FIGS. 7A and 7B are top views similar to FIG. 1, showing the image sensor deployed to align with the alignment module and the LOE, respectively, according to an embodiment of the present disclosure.

Refer now to FIG. 7A, the sliding arrangement 66 in a first position so as to position the image sensor 90 in a first location. When the image sensor 90 is in the first location, the lens 92 (which may include multiple lenses) of the image sensor 90 is aligned with the alignment module such that the test pattern 86 is positioned within the field of view of the lens 92.

FIG. 8 shows a front view of the test pattern 86, when implemented as a slit, taken from the perspective of the image sensor 90 when the image sensor 90 is aligned with the alignment module 80 (FIG. 7A). The test pattern 86 may generally be deployed at any known and fixed orientation, including vertically, horizontally, or any angle therebetween. However, orienting the test pattern 86 at an angle of approximately 30°, as illustrated in FIG. 8, is advantageous when utilizing certain image processing algorithms (e.g., edge detection algorithms), as such an orientation provides the algorithm with more clearly defined edge regions, thereby more easily accommodating estimation of the orientation of the test pattern 86. As discussed above, the angle is measured from the central axis 87 of the test pattern 86 to the reference axis, which in FIG. 8 is the axis of horizontal movement of the image sensor 90.

With continued reference to FIG. 7A, the image sensor 90 captures one or more images of the test pattern 90 when image sensor 90 is in the first location. When in the first location, the lens 92 of the image sensor 90 is spaced apart from the test pattern 86 by approximately 10-15 centimeters. As mentioned above when discussing the focus and alignment stage, the image sensor 90 is focused to infinity when capturing the image light waves that are coupled out of the LOE 70. Since it is preferable to keep the image sensor 90 at a fixed focus (i.e., permanently focused to infinity), images of the test pattern 86 are preferably captured with the aperture of the image sensor 90 in a decreased aperture state, in order to ensure a sharp image in which the edges of the test pattern 86 are distinct and can be more easily identified by image processing algorithms.

The images captured by the image sensor 90, when image sensor 90 is in the first location, are analyzed by a computerized processor (e.g., an image processor) linked to the image sensor 90 in order to estimate the orientation (i.e., angle) of the test pattern 86. The processor compares the estimated orientation of the test pattern 86 to the known true orientation of the test pattern 86. In certain embodiments, the comparison forms a comparison measure, which may be, for example, formed by taking the absolute value of the difference between the estimated orientation and the known orientation. In such embodiments, a determination is made, by the computerized processor, as to whether the estimated orientation is within an allowed tolerance (e.g., $+/-\tau°$). If the estimated orientation is within the allowed tolerance, the image sensor 90 is deemed as being properly aligned. If, however, the estimated orientation is not within the allowed tolerance, the orientation parameter of the image sensor 90 is adjusted. In certain embodiments, the adjustment of the orientation parameter of the image sensor 90 is performed via rotation of the image sensor (via the sub-assembly that attaches the image sensor 90 to the sliding arrangement 66) about a principle axis of the image sensor 90, which may be the optical axis of the lens 92. Subsequent to the orientation parameter adjustment, another image is captured by the image sensor 90, and the analysis and comparison steps, outlined above, are repeated, until the estimated orientation is within the allowed tolerance. The indication of whether the estimated orientation is within the allowed tolerance may be provided in real-time, so as to allow an operator of the environment 1 to continuously adjust the orientation parameter of the image sensor 90 until a stopping condition is met (i.e., until the estimated orientation of the test pattern 86 is within the allowed tolerance). In this way, the orientation parameter (i.e., angle) of the image sensor 90 is adjusted, by the operator, so as to converge to within the allowed tolerance value.

In other embodiments, the processor may provide a correction value as output from the comparison between the estimated orientation and known orientation of the test pattern 86. In such embodiments, if the estimated orientation and known (i.e., true) orientation do not match (within a tolerance value), a correction value is determined by the processor. For example, if the test pattern 86 is at a known angle of 30° (as shown in FIG. 8), and the estimated angle is determined to be 35°, the correction value is calculated as 5°. The correction value is applied to the orientation of the image sensor 90 by adjusting the orientation of the image sensor 90 via rotation of the image sensor (via the sub-assembly that attaches the image sensor 90 to the sliding arrangement 66) about a principle axis of the image sensor 90, which may be the optical axis of the lens 92. The correction value can be calculated as the difference between the estimated angle and the true angle. In such embodiments, the sign of the correction value can be used to indicate the required direction of rotation. In certain embodiments, the image sensor 90 is rotated about a principle axis of the image sensor 90 toward the reference axis (e.g., the axis of horizontal movement of the image sensor 90) if the correction value is positive, and rotated away from the reference axis if the correction value is negative. Continuing with the above example of a correction value of 5°, the image sensor 90 is rotated about a principle axis of the lens 92 by 5° toward the reference axis In principle, once the orientation of the image sensor 90 is corrected and properly aligned with the alignment module 80, the image sensor 90 can be moved in front of the LOE 70 in order to allow capturing of the image light waves being coupled out of the LOE 70 in accordance with the method steps of the focusing and alignment stage. The movement of the image sensor 90 in front of the LOE 70 is effectuated by moving the sliding arrangement 66 to a second position so as to position the image sensor 90 in a second location in which the lens 92 of the image sensor is aligned with the LOE 70. Generally speaking, the image sensor 90 is positioned within the eye motion box, at the eye relief distance from the LOE 70, when in the second location. FIG. 7B shows the sliding arrangement 66 in the second position by which the image sensor 90 is positioned at the second location.

In certain embodiments, the images of the test pattern 86 captured by the image sensor 90 are grayscale images, for example, 8-bit grayscale images. In such embodiments, each image pixel takes on a value between a minimum pixel value and a maximum pixel value. In certain implementations of 8-bit grayscale images, the minimum pixel value is 0 and the maximum pixel value is 255, while in other implementations the minimum pixel value may be −127 and the maximum pixel value may be 128. The pixel values are representative of the amount of light captured in each specific pixel, with darker pixels corresponding to lower values and brighter pixels corresponding to higher values.

As mentioned above, a computerized processor analyzes the images of the test pattern 86 captured by the image sensor 90. The image analysis performed by the processor includes the execution of one or more image processing algorithms in order to estimate the angle of the test pattern 86. The following paragraphs describe an exemplary image processing algorithm according to an embodiment of the present disclosure, which can be used to estimate the angle of the test pattern 86.

Figure 9:
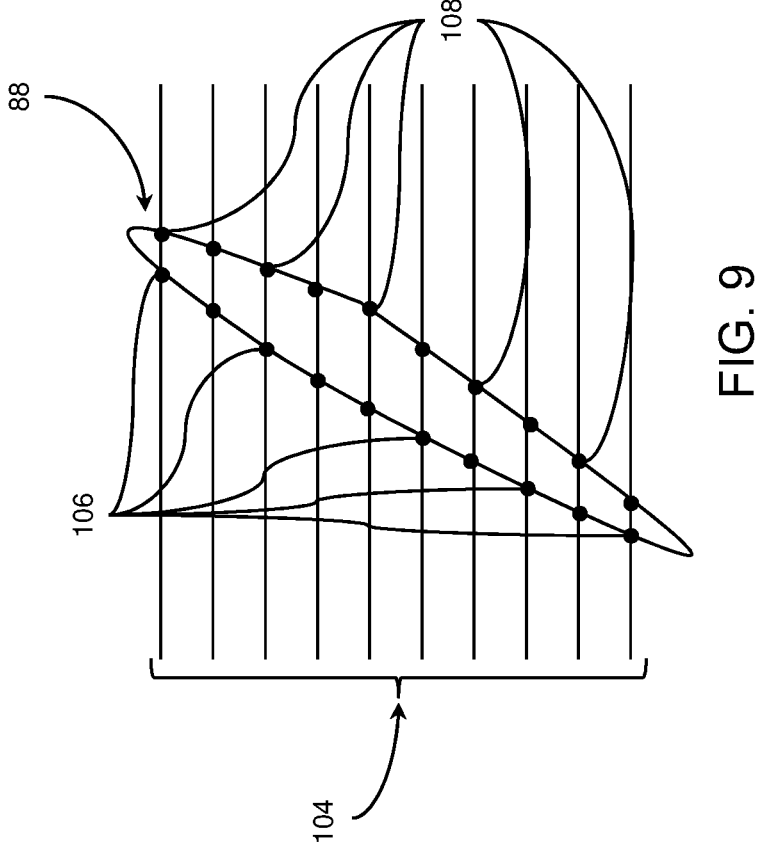
FIG. 9 is a schematic representation of an image of the slit captured by the image sensor and sample points at respective edges of the image, according to an embodiment of the present disclosure.

FIG. 9 shows an example of a captured image 88 of the test pattern 86 when implemented as a slit. Noise and other interfering factors may add variations to the edge and end portions of the test pattern 86, resulting in the captured image 88 portraying the test pattern 86 as being oblong in shape with various imperfections. For clarity of illustration, superimposed on the image 88 are a series of horizontal strips 104 which slice the image 88 into multiple samples. The spacing between the strips 104 is preferably uniform, and is a function of the sampling rate of the image 88 executed by the exemplary image processing algorithm.

For each of the strips 104, jumps from darker edge pixels to bright edge pixels are identified in order to identify points along the edges of the image 88. In FIG. 9, the points along the left edge (i.e., side) of the image 88 are generally indicated as 106, and the points along the right edge (i.e., side) of the image 88 are generally indicated as 108. For clarity of illustration, only some of the points on the edges of the image 88 are labeled.

The jumps may be identified using various mathematical methods. For example, the first derivative of the light intensity function of the image can be evaluated to determine an image gradient. The image gradient can then be analyzed, specifically by looking for high values in the image gradient which correspond to jumps. Edge detection algorithms may also be applied in order to identify the jumps, with varying degrees of accuracy.

Line fitting techniques are used to construct two separate lines, one line that fits the points 106, and a second line that fits the points 108. Examples of such techniques, include, but are not limited to, regression techniques, for example, simple linear regression and total least squares, which includes orthogonal regression and Deming regression.

Figure 10:
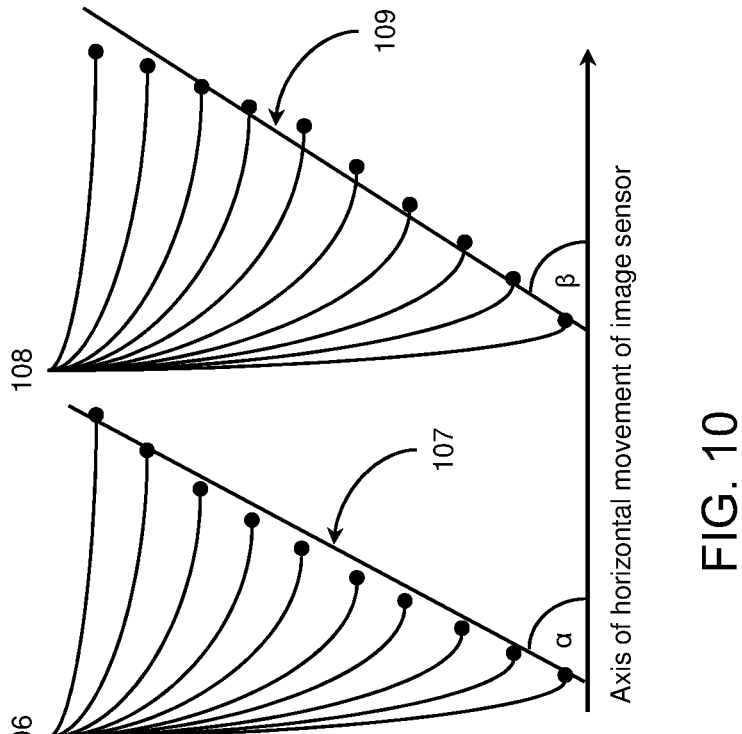
FIG. 10 is a schematic representation of fit lines at respective edges of the image of FIG. 9, according to an embodiment of the present disclosure.

FIG. 10 shows the results of the line fitting, in which a first line 107 fits the points 106, and a second line 109 fits the points 108. The angles of the first line 107 and the second line 109, measured relative to the reference axis (e.g., axis of horizontal movement of the image sensor are calculated. The angle of the first line 107 is denoted by a, and the angle of the second line 109 is denoted by β. The angles α and β are averaged together to produce the estimated angle of the test pattern 86.

Although the exemplary interpolation-based image processing algorithm has been described above within the context of the test pattern 86 implemented as a rectangular slit, the same or similar interpolation-based image processing algorithm may be used in embodiments in which the test pattern 86 is implemented as a non-rectangular slit. Regardless of the shape of the test pattern 86, the same basic principles of line fitting edges of the test pattern 86 may apply. The angles of the fit lines relative to the reference axis can be calculated, and the calculated angles for each of the fit lines of the test pattern 86 can be combined, according to mathematical principles (e.g., statistical principles, geometric principles, etc.).

Figure 11:
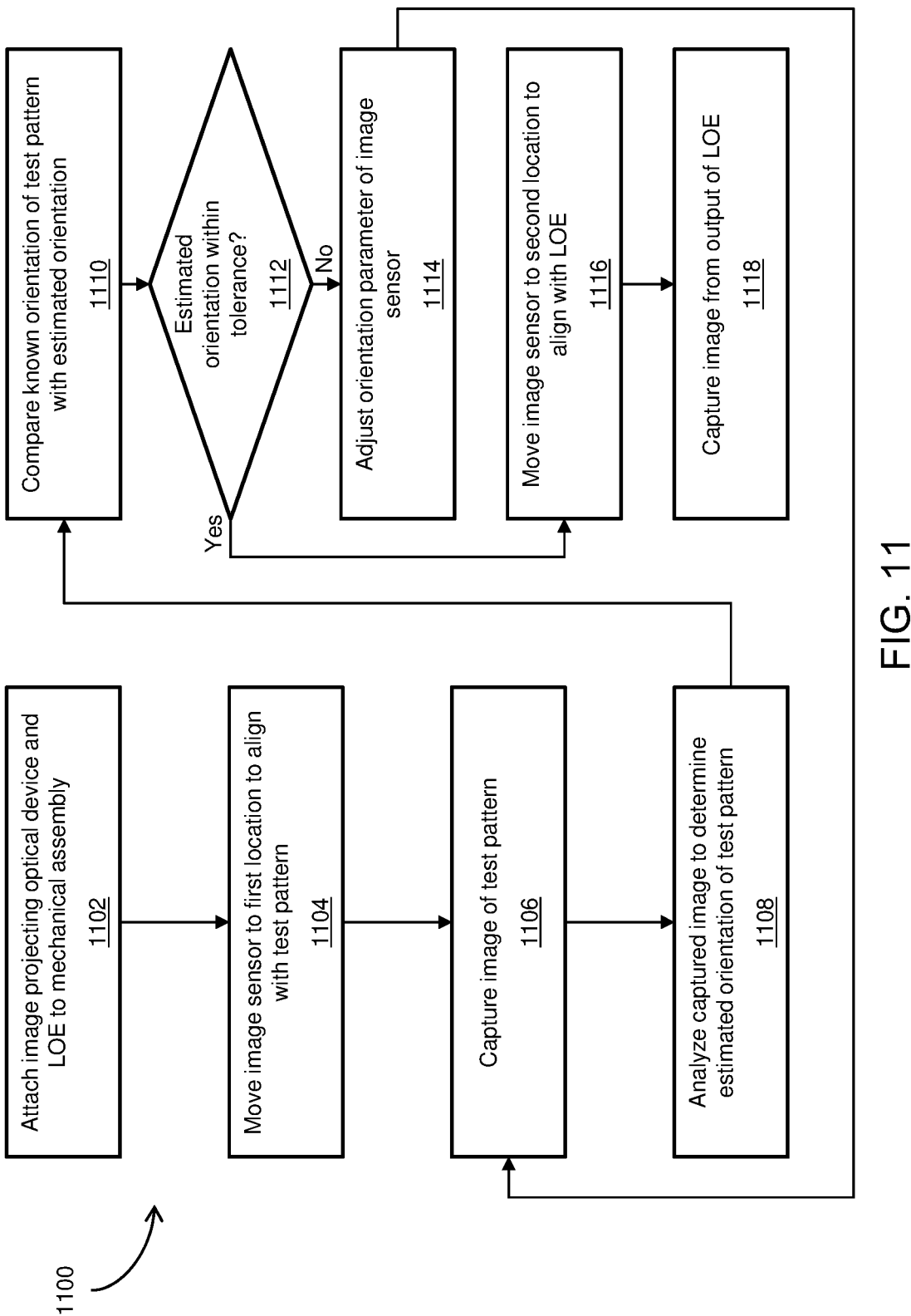
FIG. 11 is a flow diagram illustrating a process for performing orientation alignment of the image sensor, according to embodiments of the present disclosure.

Attention is now directed to FIG. 11 which shows a flow diagram detailing a process 1100 in accordance with the disclosed subject matter. The process 1100 includes steps for aligning the image sensor 90. Some of the sub-processes of the process 1100 may be performed manually by an operator of the environment 1 or may be performed automatically by various mechanical and computerized components, such as processors and the like.

The process 1100 begins at block 1102, where the image projecting optical device 10 and the LOE 70 are mechanically attached to the mechanical assembly, at known and fixed orientations, via the respective sub-assemblies 61, 63. The process 1100 then moves to block 1104, where the image sensor 90 is moved to the first location, i.e., into alignment with the alignment module 80. As discussed above, the movement of the image sensor 90 is facilitated by movement of the sliding arrangement 66.

The process 1100 then moves to block 1106, where the image sensor 90 captures one or more images of the test pattern. The image of the test pattern 86 may be displayed on the display monitor 100 for viewing by the operator of the environment 1. The process then moves to block 1108, where each captured image of the test pattern 86 is analyzed, by a processor (e.g., an image processor), in order to determine an estimated orientation (i.e., angle) of the test pattern 86. The estimated angle may be displayed on the display monitor 100 for viewing by the operator of the environment 1. In embodiments in which multiple images of the test pattern 86 are captured, the processor may process each of the images separately in order to produce multiple estimates of the orientation of the test pattern 86. The multiple estimates may then be combined into a single estimate via averaging or other statistical methods known in the art. Alternatively, the processor may co-process the images together to form a single orientation estimate.

As discussed above, various image processing techniques may be used to estimate the orientation of the test pattern 86. The image processing techniques include, but are not limited to, line fitting algorithms, edge detection algorithms, and any combination thereof.

From block 1108, the process 1100 moves to block 1110, where the known orientation of the test pattern 86 and the estimated orientation of the test pattern 86 (based on the captured image) are compared to form a comparison measure. The comparison measure may be formed, for example, by taking the absolute value of the difference between the estimated orientation and the known orientation. The process 1100 then moves to block 1112, where a determination is made, based on the comparison measure output from block 1110, as to whether the estimated orientation is within an allowed tolerance. The determination in block 1112 may be made, for example, by evaluating the comparison measure against a threshold criterion. For example, the absolute value of the difference between the estimated orientation and the known orientation may be evaluated against an allowed tolerance value, to determine if the difference is greater than the allowed tolerance value or less than (or equal to) the allowed tolerance value. In principle, the allowed tolerance value may be on the order of several hundredths of a degree and up to one or two tenths of a degree. If the estimated orientation is within the allowed tolerance, the process 1100 moves to block 1116 from block 1112, where the image sensor 90, now deemed as properly aligned, is moved to the second location, i.e., into alignment with the LOE 70. As discussed above, the movement to the second location is facilitated by movement of the sliding arrangement 66. The process 1100 then moves to block 1118, where the image sensor 90 captures the image light waves that are coupled out of the LOE 70. The execution of block 1118 may be performed as one or more of the steps performed in the process 500.

If, however, the estimated orientation is not within the allowed tolerance (e.g., not within of the known orientation), the process 1100 moves to block 1114 from block 1112, where an orientation parameter of the image sensor 90, i.e., the angle about a principle axis of the image sensor 90 (e.g., the optical axis of the lens 92), is adjusted (i.e., the image sensor 90 is rotated about its principle axis). From block 1114, the process 1100 then returns to block 1106, where a new image of the test pattern 86 is captured by the image sensor 90. The blocks 1106-1114 are repeated as necessary until the estimated orientation is within the allowed tolerance, where the process 1100 moves to block 1116 from block 1112, as described above.

The iterative nature of the process 1100 allows an operator of the environment 1 to align the image sensor 90 in a relatively short period of time. In certain embodiments, the image capture, analysis, comparison, determination, and adjustment executed in blocks 1106-1114 are performed such that the processor is able to provide the operator with a continuous or near-continuous indication of whether the estimated orientation is within the allowed tolerance. The indication of whether the estimated orientation is within the allowed tolerance may be displayed visually to the operator of the environment 1, for example via the display monitor 100.

Note that the allowed tolerance may be a pre-determined value that is programmed into a memory of a computer or computing device (e.g., the processor or other processing device linked to the processor) that is operated by operator of the environment 1. In certain embodiments, various tests and experiments may be performed prior to executing the method steps of the process 1100. Such test and experiments may use the image sensor 90, the image projecting optical device 10, and the LOE 70, in order to evaluate system performance according to performance metrics (e.g., quality and accuracy of the image coupled out of the LOE 70) as a function of the orientation error between the image sensor 90 and the LOE 70. The allowed tolerance value may then be determined and programmed based on the performance metrics that meet system performance requirements according to system level specifications. For example, the performance metrics may indicate that the overall system meets performance requirements when the tolerance value is 0.10°, but fails to meet such requirements when the tolerance value is 0.15°.

Although the embodiments of the process 1100 described above have pertained to image capture, analysis, comparison, determination, and adjustment, as executed in blocks 1106-1114, being performed to allow a processor to provide a continuous or near-continuous indication of whether the estimated orientation is within the allowed tolerance, other embodiments are possible in which the processor provides discrete correction values in response to the comparison performed in block 1110. For example, the comparison output may be treated as a correction value, to be applied to the orientation parameter of the image sensor 90. In such embodiments, the orientation parameter of the image sensor 90 is adjusted based on the determined correction value. In such embodiments, the steps of image capture, comparison, and adjustment, as executed in blocks 1106, 1108, and 1114, respectively, may be repeated until the estimated orientation is within a predefined allowed tolerance value (e.g., $+/-\tau°$ where $\tau$ may be approximately 0.10°).

It is further noted that blocks 1104-1114 may be executed subsequent to the execution of one or more of the steps described in the process 500, in order to check/correct the alignment of the image sensor 90. Furthermore, subsequent executing blocks 1116-1118, the image projecting optical device 10 and the LOE 70 may be swapped out for a new image projecting optical device and LOE, and the alignment procedure may be continued to ensure proper alignment of the new image projecting optical device and LOE.

Alternatively, two sets of image projecting optical devices and LOEs, such as used in stereo vision systems, may be deployed and mechanically attached to the mechanical assembly (i.e., block 1102 may be performed twice, once for each LOE/image projecting optical device pair). Subsequent to performing blocks 1104-1114, blocks 1116-1118 may be performed twice, once for each LOE/image projecting optical device pair.

Although the embodiments of the present disclosure as described thus far have pertained to utilizing a single image sensor, moveable between two positions, to alternately capture images of the alignment module 80 and from the LOE output, other embodiments are possible in which more than one image sensor is deployed to capture images. In such embodiments, for example, two image sensors may be used, with the first image sensor operating at a lower resolution than the second image sensor. Such embodiments may be used to advantage in situations in which the focusing and alignment stage is carried out as a coarse-fine process, in which coarse adjustments are made based on images captured by the lower resolution image sensor, and fine adjustments are made based on images captured by higher resolution image sensor.

In discussing the execution of the steps of the processes 500 and 1100, references were made to the movement of various mechanical and optical components, as well as the execution of image processing functions. The following paragraphs describe non-limiting examples of instrumentation (i.e., components) and techniques used to perform the method steps associated with the processes 500 and 1100. Instrumentation and Techniques for Performing Focusing and Alignment Stage and Orientation Alignment Stage As discussed in detail above, several of the method steps associated with the processes 500 and 1100, in particular blocks 506 and 508 of the process 500, and block 1108 of the process 1100, are performed by the execution of various image processing techniques. The image processing techniques may be executed by a computerized processor, which may be part of a processing system. In addition, several of the method steps associated with the process 1100, in particular blocks 1110 and 1112, involve performing logic operations including comparisons and determining whether outputs from the comparisons satisfy threshold criteria (i.e., whether the absolute difference between the estimated orientation and the known orientation is greater than or less than an allowed tolerance value). Such logic operations, in the form of comparisons and evaluations against threshold criteria, are preferably performed by computerized processors, which in certain embodiments is the same processor that performs the image processing techniques.

Figure 12:
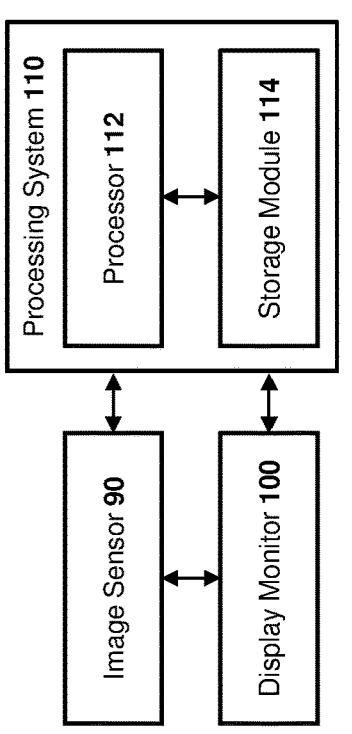
FIG. 12 is a block diagram of an example architecture of an exemplary processing system linked to the image sensor and a display monitor, for performing one or more steps of the processes illustrated in FIGS. 5 and 11, according to an embodiment of the present disclosure.

FIG. 12 shows a block diagram of an example architecture of such a processing system, generally designated 110 that includes at least one computerized processor. The processing system 110 is linked to the image sensor 90 and the display monitor 100, such that processing system 110 can receive image data from the image sensor 90, and provide processed output to the display monitor 100 for display.

The processing system 110 includes at least one processor 112 coupled to a storage module 114 such as a memory or the like. The processor 112 can be implemented as any number of computerized processors, including, but not limited to, a microprocessor, an ASIC, and a DSP. In certain non-limiting implementations, the processor 112 is advantageously implemented as an image processor. All of such processors include, or may be in communication with non-transitory computer readable media, such as, for example, the storage module 114. Such non-transitory computer readable media store program code or instructions sets that, when executed by the processor 112, cause the processor 112 to perform actions. Types of non-transitory computer readable media include, but are not limited to, electronic, optical, magnetic, or other storage or transmission devices capable of providing a processor, such as the processor 112, with computer readable instructions.

In certain embodiments, the processor 112 is configured to perform image processing functions, in accordance with blocks 506 and 508 of the process 500, and block 1108 of the process 1100, and is further configured to perform other various logic functions, for example in accordance with blocks 1110 and 1112 of the process 1100. In embodiments in which determinations are made as to whether the estimated orientation is within an allowed tolerance, the storage module 114 may be configured to store the allowed tolerance value (or values). Alternatively, the allowed tolerance value may be stored in a volatile or non-volatile memory of the processor 112. In other embodiments, the various aforementioned image processing and logic functions are performed by separate processors, which are part of the same processing system 110, or may be part of separate similar processing systems that are linked to each other.

In embodiments in which differences between the estimated orientation and known orientation are used to determine a correction value to be applied to the orientation parameter of the image sensor 90, the processor 112 may be configured to determine the correction value.

As further discussed above, the image processing steps are executed in conjunction with movement of various mechanical and optical components. Such movement is outlined in the method steps associated with the processes 500 and 1100, in particular blocks 506-508 of the process 500, and blocks 1104, 1114 and 1116 of the process 1100. As discussed, the movement of the aforementioned components is enabled by various sub-assemblies of the mechanical assembly 60. The following paragraphs, with reference to FIGS. 13 and 14, describe a more detailed non-limiting schematic representation of the mechanical assembly 60 according to an embodiment of the present disclosure, that can be used when performing the steps of the processes 500 and 1100.

Figure 13:
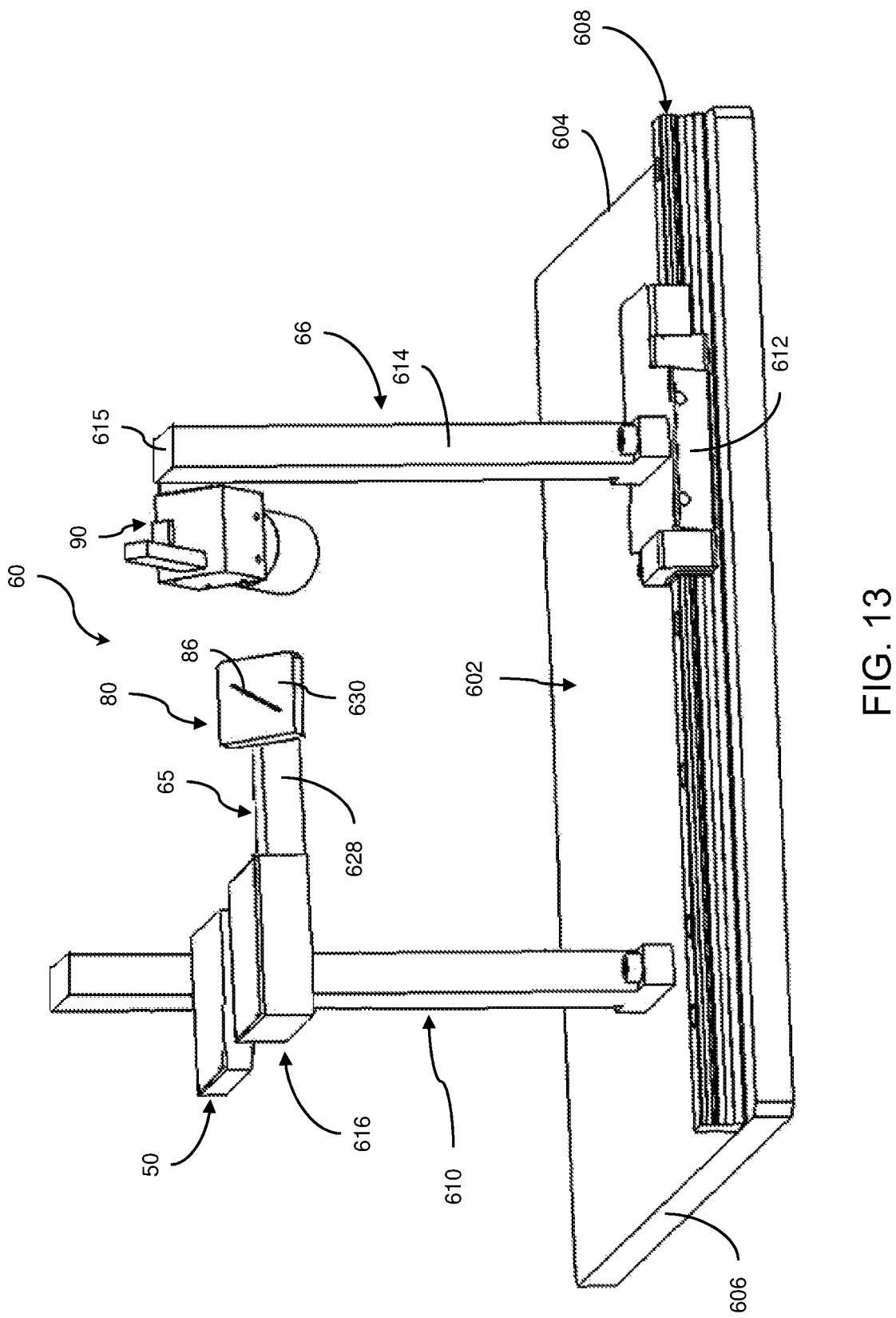
FIG. 13 is an isometric view illustrating a schematic representation of a mechanical assembly that can be used to perform embodiments of the present disclosure.

As shown in FIG. 13, the mechanical assembly 60 includes a base 602 that is generally planar and extends between to ends, namely a first end 604 and a second end 606. A sliding rail 608 is mechanically attached, via screws or the like, to the base 604 and extends between the two ends 604, 606. A stand 610 extends upward from the base near the second end 606. The stand 610 is fixedly mounted to the base 602 via mechanical fasteners, such as screws or bolts and the like. The sliding rail 608 and a base 612 of the sliding arrangement 66 are correspondingly configured, so as to allow the sliding arrangement 66 to move laterally across the base 602 between the two ends 604, 606. The sliding arrangement 66 has a stand 614 that extends upward from the base 612, and that is mechanically attached to the base 612 via mechanical fasteners, such as screws or bolts and the like. The image sensor 90 is mechanically coupled to a top portion 615 (i.e., distal portion from the base 612) of the stand 614 via a mechanical sub-assembly that allows adjustment of the orientation of the image sensor 90.

In certain embodiments, stoppers may be deployed at different positions along the sliding rail 608, for example at or near the horizontal position of the LOE 70 and the alignment module (i.e., the test pattern 86). In this way, the sliding arrangement 66 may move between two resting positions, so as to alternately align with the LOE 70 and the alignment module 80. In certain embodiments, the movement of the sliding arrangement 66 is manually induced (i.e., hand-operated by a user of the optical test bench). In other embodiments, the sliding arrangement 66 is electro-mechanically operated, and movement thereof is enabled by a driving arrangement (e.g., actuator with mechanical linkage) coupled to a computer or computing device that allows the user of the optical test bench (i.e., the environment 1) to actuate movement of the sliding arrangement 66 between the resting positions via a user interface or the like implemented on the computer or computing device. In still yet other embodiments, the movement of the sliding arrangement 66 is manually induced and aided by an electro-mechanical driving arrangement.

FIG. 13 also shows a member 616 deployed relative to the stand 610. The member 616 is a schematic representation of the LOE 70, the collimating prism assembly 18, and the second sub-assembly 63 which fixedly mounts the LOE 70 and the collimating prism assembly 18 to the stand 610 of the mechanical assembly 60 in a fixed and known orientation. Although the collimating prism assembly 18 may be considered as one of the components of the image projecting optical device 10, the collimating prism assembly 18 may be attached to the LOE 70 via an optical attachment (e.g. cement) or a mechanical attachment (e.g., a bracket arrangement or the like). The mounting of the member 616 to the mechanical assembly 60 is made via mechanical attachment of the second sub-assembly 63 to an upper portion of the stand 610. The second sub-assembly 63 may include one or more brackets and/or one or more stoppers arranged to hold the LOE 70 in a known and fixed position and orientation relative to the mechanical assembly 60.

Figure 14:
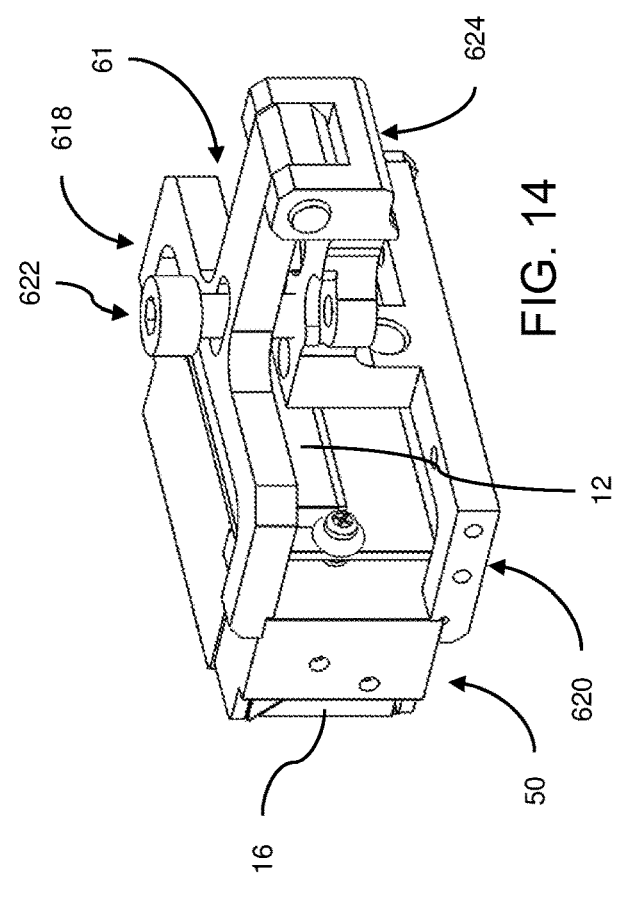
FIG. 14 is an isometric view of a sub-assembly of the mechanical assembly, attached to components of the image projecting optical device, according to an embodiment of the present disclosure.

The single unit 50 is positioned behind the member 616. The single unit 50 is a mechanical body that holds the electronic display source 12, the illumination module 14, and the illumination prism assembly 16. FIG. 14 shows a more detailed illustration of the single unit 50, as well as the first sub-assembly 61, according to a non-limiting example construction. In the non-limiting construction, the first sub-assembly 61 is implemented as a double clamping arrangement, that includes an upper clamping member 618 and a lower clamping member 620, configured to hold the single unit 50. The clamping members 618, 620 respectively hold the top and bottom portions of the single unit 50, and are connected together by a central pin 622 and an end joint 624.

The single unit 50 may be formed as a closed or semi-closed box-like structure having the electronic display source 12, the illumination module 14, and the illumination prism assembly 16 housed therein. In the non-limiting construction shown in FIG. 14, the electronic display source 12 is coupled to the housing via a base plate and mechanical fasteners (e.g., screws).

Although not shown in the drawings, the joint 624 is mechanically attached to the stand 610 via a mechanical linkage. An arrangement of adjustment mechanisms (e.g., knobs, dials, etc.) are coupled to the mechanical linkage to facilitate the adjustable positioning of the first sub-assembly 61 relative to the member 616, so as to allow for the displacing and translational moving of the single unit 50 in accordance with the process 500.

With respect to the displacement described in block 506, and the translational movement described in block 508, the displacing and translational actions may be performed by applying force to one or more sub-components of the first sub-assembly 61. In certain embodiments, the displacing and translational actions are induced manually (i.e., hand-operated) by an operator/user operating one or more of the adjustment mechanisms coupled to the mechanical linkage. Such manual operations may include, for example, hand operation of the one or more adjustment mechanisms, which may include, for example, turning of knobs or dials. For example, turning one set of knobs or dials may displace the single unit 50 by an incremental amount in proportion to the amount and direction of turn of the knob/dial. Similarly, turning another set of knobs or dials may translate the single unit 50 an incremental amount in proportion to the amount and direction of turn of the knob/dial.

It is noted that in principle the displacement and translational amounts are typically on the order of several micrometers (e.g., tens of micrometers and possibly up to a few hundred micrometers), and many types of equipment used in optical laboratory test benches provide mechanical assemblies and instruments capable of accommodating small adjustment amounts based on hand-operation of the such instruments.

In practice, one or more slabs of glass may be placed between the single unit 50 and the member 616 to provide an interface region between the illumination prism assembly 16 and the collimating prism assembly 18. As an example, the slabs may be positioned between the adjacent light-transmissive surfaces 36 and 38 of the prism assemblies 16, 18. After the single unit 50 is displaced and translationally moved (per the method steps of the process 500), optical cement may be applied between the slabs and the adjacent surfaces of the prism assemblies 16, 18 to form an optical attachment between the prism assemblies 16, 18.

Returning to FIG. 13, the alignment module 80 is mechanically coupled to a side portion of the stand 610 via the third sub-assembly 65. The third sub-assembly 65 is attached to the side portion of the stand 610 near the member 616. In the schematic representation of the mechanical assembly 60 illustrated in FIG. 13, the third sub-assembly 65 includes an extending arm 628 that is mechanically attached, at a first end 626, to the side portion of the stand 610. The mechanical attachment of the extending arm 628 to the stand 610 is made via mechanical fasteners, such as screws or the like. A base plate 630 is deployed at a second end of the extending arm 628. The test pattern 86 is arranged on the base plate 630. Although not shown in FIG. 13, the light source 82 and the diffuser 84 are attached to the back side of the base plate 630 (i.e., behind the test pattern 628).

It is noted that the attachment of the LOE 70 and the alignment module 80 to the mechanical assembly 60 is performed prior to the execution of the steps of the alignment methodologies described in the present disclosure. The LOE 70 is attached to the mechanical assembly 60 in a fixed orientation, such that, when the image sensor 90 is positioned in the eye motion box at the eye relief distance, image capture (by the image sensor 90) of the entire image (i.e., full FOV) projected by the LOE 70 is enabled. The attachment of the LOE 70 and the alignment module 80 to the mechanical assembly 60 is made using various types of optical test equipment known in the art, including, for example, auto-collimators, which facilitate attachment of the aforesaid components to the mechanical assembly 60 in known and fixed orientations with relatively high accuracy levels. In this way, a linkage is established between the orientation of the alignment module 80 and the orientation of the LOE 70, such that correction of the alignment of the image sensor 90 relative to the alignment module 80 ensures proper alignment of the image sensor 90 relative to the LOE 70 as well.

Although the displacing and translational actions of the single unit 50, as described above, may be induced via hand-operation of one or more adjustment mechanisms of the mechanical assembly 60, other embodiments are possible, in which such adjustment mechanisms are operated by an electro-mechanical control system.

Figure 15:
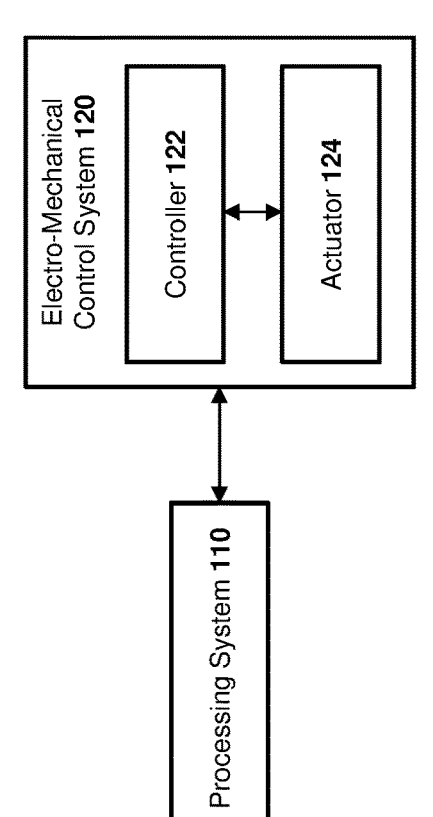
FIG. 15 is a block diagram of an example architecture of an exemplary control system linked to the processing system, for performing one or more steps of the processes illustrated in FIGS. 5 and 11, according to an embodiment of the present disclosure.

FIG. 15 is a block diagram of an example architecture of such an electro-mechanical control system, generally designated 120. The electro-mechanical control system 120 is linked to the processing system 110 and includes a controller 122 and an actuator 124. The controller 122 can be implemented as any number of computerized processors, including, but not limited to, a microcontroller, a microprocessor, an ASIC, and a DSP. All of such processors include, or may be in communication with non-transitory computer readable media that stores program code or instructions sets that, when executed by the controller 122, cause the controller 122 to perform actions. Types of non-transitory computer readable media include, but are not limited to, electronic, optical, magnetic, or other storage or transmission devices capable of providing a processor, such as the controller 122, with computer readable instructions.

The actuator 124 may be a mechanical actuator, for example a stepper motor, that causes the displacing and translational actions by applying force to one or more sub-components of the first sub-assembly 61 in response to controlled input from the controller 122. The controller 122 may receive image quality metrics, such as the focus quality and LoS evaluation, as input from the processing system 110, so as to provide feedback control to the actuator 124 to adjust the adjustment mechanisms based on the focus quality and LoS evaluation.

In certain embodiments, the actuator 124 may also control the adjustment of the orientation parameter of the image sensor 90. In such embodiments, the actuator 124 causes rotational adjustment by applying force to the sub-assembly that attaches the image sensor 90 to the sliding arrangement 66. The actuator 124 induces such rotational adjustment in response to controlled input received from the controller 122. The controlled input is provided by the controller 122 in response to output from the processing system 110 indicative of whether the estimated orientation is within the allowed tolerance, in accordance with block 1112. The processing system 110 and the electro-mechanical control system 120 may together form a closed loop system that enables convergence to within the allowed tolerance value. In such a closed loop system, the electro-mechanical control system 120 actuates the image sensor 90 to capture images of the test pattern 86. The electro-mechanical control system 120 then adjusts the orientation parameter of the image sensor 90 in response to input from the processing system 110 derived from image analysis performed on the captured images of the test pattern 86. The actuation, adjustment, and image analysis functions, performed by the electro-mechanical control system 120 and the processing system 110, are repeated until the estimated orientation (from the image analysis) is within the allowed tolerance value.

In certain embodiments, the actuator 124 may also control the movement of the sliding arrangement 66. In such embodiments, the actuator 124 receives controlled input from the controller 122 to slide the sliding arrangement 66 between the first and second positions. In such embodiments, the controller 122 is preferably linked to a computer or computing device having a user interface implemented thereon, to allow the operator to provide input commands to the controller 122 in order to initiate controlled movement of the sliding arrangement 66. Alternatively, the motion of the sliding arrangement 66 may be fully automated by the controller 122.

Note that in certain embodiments, the image processing and control functionality may be implemented by a single processing-control subsystem having one or more processors.

Description of Example Waveguide Implementations

As discussed above, when performing the method steps of the alignment methods of embodiments of the present disclosure, the image sensor 90 captures image light waves that are coupled out of the LOE 70. The LOE 70 functions as an optical waveguide that guides light waves from an input optical surface to an output optical surface. In certain non-limiting implementations, the image light waves from the image projecting optical device 10 are coupled into the LOE 70 and are guided through the LOE 70, by total internal reflection. The guided light waves are then coupled out of the LOE 70 as image light waves by one or more partially reflecting surfaces. When in use by the end-user (i.e., subsequent to final assembly in eyeglasses or the like), the coupled-out light waves are projected into an eye (or eyes) of the user (i.e., viewer).

Figure 16:
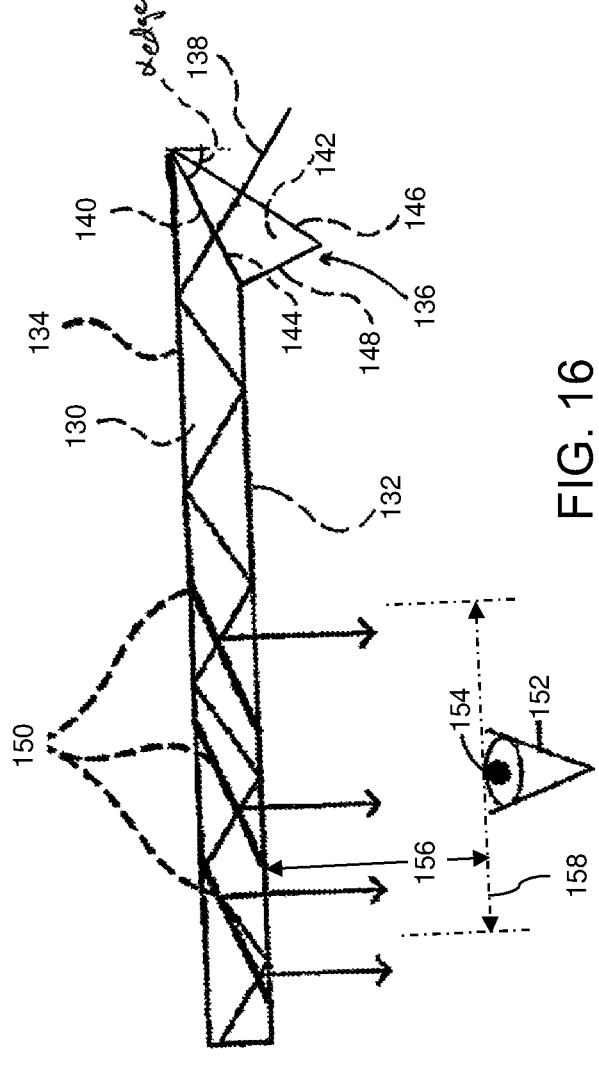
FIG. 16 is a sectional view illustrating a schematic representation of an implementation of an LOE, according to an embodiment of the present disclosure.

FIG. 16 illustrates an example of an implementation of an LOE. The LOE is formed of a light waves-transmitting planar substrate 130 that includes a major lower surface 132 and a major upper surface 134 that are parallel to each other. A coupling-in optical element 136 is illuminated by collimated light waves (represented by optical ray 138) from the image projecting optical device 10. The coupling-in optical element 136 includes a slanted edge 140 of the substrate 130 and a prism 142. The edge 140 is oriented at an oblique angle with respect to the major lower and upper surfaces 132, 134 of the substrate 130, wherein $\alpha_{edge}$ is the angle between the edge 140 and the normal to the major lower and upper surfaces 132, 134 of the substrate 130. The prism 142 includes three major surfaces 144, 146, 148, with the surface 144 being located next to the edge 140 of the substrate 130, and surfaces 146 and 148 being polished surfaces. In certain embodiments, the refractive index of the prism 142 is similar to the refractive index of the substrate 130, while in other embodiments the prism 142 and the substrate 130 have different refractive indices. The optical ray 138 enters the prism 142 through the surface 146. The surface 146 is preferably oriented normally to the central light wave of the incoming ray (i.e., the optical ray 138). The optical ray 138 then passes through the surface 144 to enter the substrate 130 through the edge 140, whereby the optical ray 138 is trapped inside the planar substrate 130 of the LOE by total internal reflection. After several reflections of the major lower and upper surfaces 132, 134 of the substrate 130, the trapped waves reach a coupling-out optical arrangement 150, implemented for example, as an array of selective partially reflecting surfaces, which couple the light waves out of the substrate 130 out of the substrate 130.

When the LOE of FIG. 16 is used as the LOE 70 when performing the method steps of the alignment methods of embodiments of the present disclosure, the coupling-out optical arrangement 150 couples the light waves out of the substrate 130 so that the coupled-out light waves may be captured by the image sensor 90.

Note that although FIG. 16 depicts the input surface of the LOE (i.e., the surface through which the input light waves enter the LOE) is on the slanted edge 140 and the output surface of the LOE (i.e., the surface through which the trapped waves exit the LOE) is on the lower major surface 132, other configurations are envisioned. In one such configuration, the input and output surfaces could be located on the same side of the substrate 130. In such a configuration, the coupling-in optical element 136 may be realized by a reflecting surface that is oriented at an oblique angle with respect to the major lower and upper surfaces 132, 134 of the substrate 130, such that the input surface of the LOE is on the major lower surface 132 and the coupling-in reflecting surface reflects the incident light waves such that the light is trapped inside the substrate 130 by total internal reflection. Still yet other configurations are envisioned in which the input surface is on the major upper surface 134 and the output surface is on the major lower surface 132.

When the LOE of FIG. 16 is in use by the end-user, the coupled-out light waves are projected into an eye (or eyes) of the user (i.e., viewer). Specifically, the coupling-out optical arrangement 150 couples the light waves out of the substrate 130 into a pupil 154 of an eye 152 of the viewer, which form an image viewed by the viewer. The eye 152 is positioned at the eye relief distance 156 from the LOE 70, and within the eye motion box 158. As discussed above, the eye motion box 158 is a two-dimensional area at the eye relief distance 156 at which the eye 152 captures the entire image (i.e., full FOV) projected by the LOE 70.

In certain embodiments, the LOE 70, together with the image projecting optical device 10, provides an augmented reality environment for the user in which the images from the image projecting optical device 10 that are coupled out of the LOE 70 can be overlaid on the real-world scene. In such embodiments, images from the real-world scene pass directly through the major lower and upper surfaces 132, 134 of the substrate 130 into the eye of the viewer, while the LOE simultaneously couples images (i.e., virtual images) from the image projecting optical device into the eye 152. In other embodiments, the LOE 70, together with the image projecting optical device 10, provides a virtual reality environment for the user in which only the virtual images from the image projecting optical device 10 are viewed by the user. In such embodiments, external real-world scene images are not transmitted though the substrate 130.

The LOE can be used as part of a mono-ocular optical system, in which images are projected into a single eye of the viewer. Alternatively, it may be desirable to project images into both eyes of the viewer, such as in head-up display (HUD) applications and stereo vision systems. In such alternatives, two optical systems can be used, with each optical system having an image projecting optical device and an LOE deployed for projecting images into a different eye of the viewer. For example, a HUD employing two optical systems may be installed in front of a car driver, for example integrated into the dashboard of a vehicle, so as to provide assistance in driving navigation or to project thermal images into the eyes of the driver in low-visibility conditions. In such embodiments, a thermal camera may be deployed to capture thermal images of the real-world scene. The thermal images may then be provided to the image projecting optical device 10 to enable coupling-in of light waves corresponding to the thermal images into the LOE.

The alignment methods of the embodiments of the present disclosure can be used to advantage in dual-optical systems (i.e., two LOE/image projecting optical device pairs), such as in HUD applications and stereo vision systems, which require proper alignment of the components of each LOE/image projecting optical device pair, as well as alignment of the two optical systems with each other, to ensure correct stereo images.

Although the alignment methods of the embodiments of the present disclosure have been described within the context of an optical waveguide implemented as an LOE, for example the LOE 70 of FIG. 16, the alignment methods of the present disclosure may be applicable to other types of optical waveguide technologies, including waveguides that rely on diffractive techniques to couple light waves into and/or out of a light waves-transmitting substrate. For example, instead of implementing the coupling-out optical arrangement 150 as an array of selectively partially reflecting surfaces, the coupling-out optical arrangement 150 can be implemented as one or more diffractive elements that extends along portions of the major lower surface 132 of the substrate 130. As a further example, instead of the implementing the coupling-in optical element 136 as a slanted edge 140 together with a prism 142, or as a reflecting surface oriented at an oblique angle, the coupling-in optical element can be implemented as a diffractive element that extends along a portion of the either the major lower surface 132 or the major upper surface 134.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form, "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A method for aligning an image sensor with an optical device, the optical device including an image projecting device and a light waves-transmitting substrate, the method comprising:

mechanically coupling at least one component of the optical device to a mechanical assembly at a known orientation, the mechanical assembly having a test pattern at a known orientation;

capturing an image of the test pattern when the image sensor is positioned at a first location in which the image sensor is aligned with the test pattern;

analyzing the captured image to determine an estimated orientation of the test pattern;

adjusting an orientation parameter of the image sensor based on a comparison between the known orientation of the test pattern and the estimated orientation of the test pattern;

coupling light waves, corresponding to an image projected by the image projecting device, into the light waves-transmitting substrate;

coupling the coupled-in light waves out of the substrate as image light waves; and capturing the image light waves with the image sensor when the image sensor is positioned at a second location in which the image sensor is aligned with the light waves-transmitting substrate.

2. The method of claim 1, wherein the orientation parameter of the image sensor includes an angle of rotation about a principle axis of the image sensor.

3. The method of claim 1, wherein the test pattern is vertically oriented relative to a reference axis.

4. The method of claim 1, wherein the test pattern is horizontally oriented relative to a reference axis.

5. The method of claim 1, wherein the test pattern is oriented at an oblique angle relative to a reference axis.

6. The method of claim 1, wherein the orientation of the test pattern is defined by at least one orientation parameter, and wherein the at least one orientation parameter of the test pattern includes an angular position of the test pattern relative to a reference axis.

7. The method of claim 1, wherein the test pattern is formed as an aperture in the mechanical assembly.

8. The method of claim 1, further comprising:

illuminating the test pattern.

9. The method of claim 1, further comprising:

moving the image sensor to the first location prior to capturing the image of the test pattern; and moving the image sensor to the second location after capturing the image of the test pattern.

10. The method of claim 1, wherein the optical device includes at least a display source, an illumination module, an illumination prism assembly, and a collimating prism assembly.

11. The method of claim 10, further comprising:

aligning the illumination module and the display source with the illumination prism assembly such that light waves emitted by the illumination module arrive at the display source via the illumination prism assembly;

displacing the display source along a displacement axis to adjust a distance between the display source and the collimating prism assembly; and translationally moving, in unison, the display source, the illumination prism assembly, and the illumination module in a plane normal to the displacement axis.

12. A method for aligning an image sensor with an optical device, the method comprising:

mechanically coupling at least one component of the optical device to a mechanical assembly at a known orientation, the mechanical assembly having a test pattern at a known orientation;

moving the image sensor to a first location prior to capturing an image of the test pattern;

capturing the image of the test pattern when the image sensor is positioned at the first location in which the image sensor is aligned with the test pattern;

analyzing the captured image to determine an estimated orientation of the test pattern;

adjusting an orientation parameter of the image sensor based on a comparison between the known orientation of the test pattern and the estimated orientation of the test pattern; and moving the image sensor to a second location after capturing the image of the test pattern.

13. A method for aligning an image sensor with an optical device that includes at least a display source, an illumination module, an illumination prism assembly, and a collimating prism assembly, the method comprising:

mechanically coupling at least one component of the optical device to a mechanical assembly at a known orientation, the mechanical assembly having a test pattern at a known orientation;

capturing an image of the test pattern when the image sensor is positioned at a first location in which the image sensor is aligned with the test pattern;

analyzing the captured image to determine an estimated orientation of the test pattern;

adjusting an orientation parameter of the image sensor based on a comparison between the known orientation of the test pattern and the estimated orientation of the test pattern;

aligning the illumination module and the display source with the illumination prism assembly such that light waves emitted by the illumination module arrive at the display source via the illumination prism assembly;

displacing the display source along a displacement axis to adjust a distance between the display source and the collimating prism assembly; and translationally moving, in unison, the display source, the illumination prism assembly, and the illumination module in a plane normal to the displacement axis.

* * * * *